(12) United States Patent
Bae et al.

(10) Patent No.: US 10,275,012 B2
(45) Date of Patent: Apr. 30, 2019

(54) OPERATING METHOD FOR DISPLAY CORRESPONDING TO LUMINANCE, DRIVING CIRCUIT, AND ELECTRONIC DEVICE SUPPORTING THE SAME

(71) Applicant: Samsung Electronics Co., Ltd., Gyeonggi-do (KR)

(72) Inventors: Jong Kon Bae, Seoul (KR); Dong Hwy Kim, Gyeonggi-do (KR); Dong Kyoon Han, Gyeonggi-do (KR); Han Yu Ool Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 5 days.

(21) Appl. No.: 15/601,046

(22) Filed: May 22, 2017

(65) Prior Publication Data

US 2017/0336851 A1 Nov. 23, 2017

(30) Foreign Application Priority Data

May 20, 2016 (KR) .................. 10-2016-0062241

(51) Int. Cl.
*G06F 1/3234* (2019.01)
*G09G 3/36* (2006.01)
*H05B 33/08* (2006.01)

(52) U.S. Cl.
CPC ......... *G06F 1/3265* (2013.01); *G09G 3/3607* (2013.01); *G09G 3/3648* (2013.01); *G09G 3/3688* (2013.01); *H05B 33/0803* (2013.01); *G09G 2310/0291* (2013.01); *G09G 2320/0626* (2013.01); *G09G 2320/0673* (2013.01); *G09G 2380/08* (2013.01); *Y02D 10/153* (2018.01)

(58) Field of Classification Search
CPC .............. G06F 1/3265; H05B 33/0803; G09G 2320/0626; G09G 2320/0673; G09G 3/3607

See application file for complete search history.

(56) References Cited

U.S. PATENT DOCUMENTS

| 9,251,752 B2 | 2/2016 | Seo et al. | |
| 2006/0001624 A1 | 1/2006 | Lee | |
| 2008/0303767 A1* | 12/2008 | Ludden | G09G 3/3688 |
| | | | 345/89 |

(Continued)

FOREIGN PATENT DOCUMENTS

| KR | 10-2008-0105977 A | 12/2008 |
| KR | 10-2013-0057673 A | 6/2013 |

(Continued)

OTHER PUBLICATIONS

International Search Report dated Aug. 23, 2017.

*Primary Examiner* — Shaheda A Abdin
(74) *Attorney, Agent, or Firm* — Cha & Reiter, LLC.

(57) ABSTRACT

A method for driving a display and an electronic device supporting the same are provided. The method includes determining a luminance setting of an output of a display panel; generating a gamma value corresponding to at least one sub pixel among sub pixels composing a pixel of the display panel when the luminance setting is equal to or lower than a specified value; and supplying the generated gamma value to the at least one sub pixel and at least one other sub pixel.

20 Claims, 13 Drawing Sheets

(56) References Cited

U.S. PATENT DOCUMENTS

| | | | |
|---|---|---|---|
| 2009/0096819 A1* | 4/2009 | Kinoshita | G09G 3/3685 |
| | | | 345/694 |
| 2013/0135362 A1 | 5/2013 | Kim et al. | |
| 2014/0320552 A1 | 10/2014 | Seo et al. | |
| 2016/0098959 A1 | 4/2016 | Moon et al. | |
| 2016/0098967 A1 | 4/2016 | Kwon et al. | |
| 2017/0061869 A1 | 3/2017 | Bae et al. | |

FOREIGN PATENT DOCUMENTS

| KR | 10-2015-0114065 A | 10/2015 |
|---|---|---|
| KR | 10-2017-0024717 A | 3/2017 |

* cited by examiner

OPERATING METHOD FOR DISPLAY CORRESPONDING TO LUMINANCE, DRIVING CIRCUIT, AND ELECTRONIC DEVICE SUPPORTING THE SAME

CLAIM OF PRIORITY

This application claims the benefit under 35 U.S.C. § 119(a) of a Korean patent application filed on May 20, 2016 in the Korean Intellectual Property Office and assigned Serial number 10-2016-0062241, the entire disclosure of which is hereby incorporated by reference.

TECHNICAL FIELD

The present disclosure generally relates to controlling the driving of a display based on luminance outputted by the display.

BACKGROUND

Currently, electronic devices such as mobile phones may include a display for displaying information.

Power consumption of the display represents a large portion of the total power consumption of the electronic device.

SUMMARY

Aspects of the present disclosure address at least the above-mentioned problems and/or disadvantages and to provide at least the advantages described below. Accordingly, an aspect of the present disclosure is to provide a display driving method capable of driving the display at low power when the luminance outputted by the display is set at or below a specified value and a display driver integrated circuit and an electronic device supporting the same.

Another aspect of the present disclosure is to provide a display driver integrated circuit and an electronic device capable of driving a specified luminance setting at low power.

In accordance with an aspect of the present disclosure, an electronic device may be provided. The electronic device may include a display panel and a driver circuit configured to drive the display panel, wherein the driver circuit includes a gamma circuit including a plurality of gamma generation units, a source driver including a plurality of amplifiers, each amplifier having a corresponding decoder, one or more switches configured to connect at least one of the plurality of gamma generation units to at least two decoders, and a logic circuit configured to control the source driver and the gamma circuit. The logic circuit is configured to control one of the plurality of gamma generation units to generate a gamma value for one or more sub pixels; and control the one or more switches so that the generated gamma value is shared with the at least two decoders when the display panel is set to output a luminance equal to or lower than a specified value.

In accordance with another aspect of the present disclosure, a method for driving a display is provided. The method may include determining a luminance setting of an output of a display panel; generating a gamma value corresponding to at least one sub pixel among sub pixels composing a pixel of the display panel when the luminance setting is equal to or lower than a specified value; and supplying the generated gamma value to the at least one sub pixel and at least one other sub pixel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
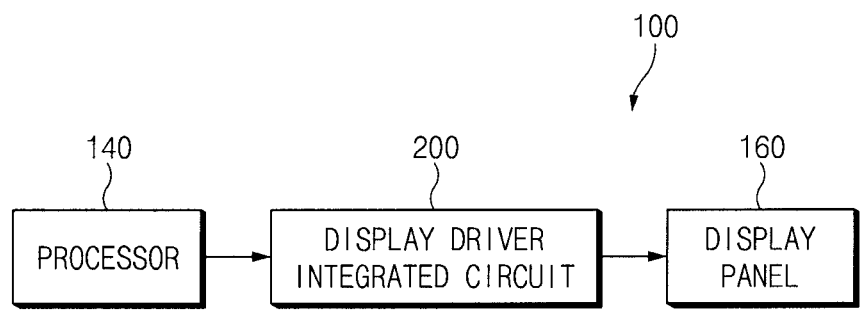
FIG. 1 is a diagram illustrating a configuration of an electronic device including a display driver integrated circuit, according to an embodiment.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have," "may have," "include," and "comprise," or "may include" and "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a diagram illustrating a configuration of an electronic device including a display driver integrated circuit, according to an embodiment.

Referring to FIG. 1, an electronic device 100 may include a processor 140 (e.g., an application processor (AP)), a display driver integrated circuit (DDI) 200, and a display panel 160. For example, the electronic device 100 may be implemented in a portable electronic device. According to one or more embodiments, the display driver integrated circuit 200 and the display panel 160 may be implemented with a separate (or external) display device (or display module) that does not include the processor 140.

The processor 140 may control overall operations of the electronic device 100. According to an embodiment, the processor 140 may be implemented with an integrated circuit, a system on chip, or a mobile AP. The processor 140 may provide data (e.g., image data, video data, or still image data) to be displayed to the display driver integrated circuit 200. According to an embodiment, the data may be divided by a line data unit (which may be a component of the display driver integrated circuit 200) into horizontal line data and vertical line data corresponding to the horizontal lines and vertical lines of the display panel 160, respectively.

The display driver integrated circuit 200 may change data provided from the processor 140 into a form capable of being provided to the display panel 160 and may provide the changed data to the display panel 160. The changed data may be supplied in units suitable for each pixel of the display panel 160. Here, with regard to displaying specific colors, a pixel may have a structure in which sub pixels Red, Green, and Blue are disposed adjacent to each other. One type of pixels may include RGB sub pixels (RGB stripe layout structure). Another type of pixels may include RGGB sub pixels (pentile layout structure). Alternatively layout arrangements, such as RGBG sub pixels and RGBW sub pixels, are also possible.

According to an embodiment, the display driver integrated circuit 200 may process pieces of display data to be supplied to the display panel 160 at a specified luminance for each pixel of the display panel 160. In each pixel, output of an amplifier allocated to at least one sub pixel may be shared with another sub pixel. For example, in the pentile layout structure including two green sub pixels, the display driver integrated circuit 200 may share output of the amplifier of the first green sub pixel with the second green sub pixel. In conjunction with this operation, the display driver integrated circuit 200 may also turn off the amplifier allocated to the second green sub pixel, thereby reducing power consumption associated with driving the amplifier of the second green sub pixel. Alternatively, the display driver integrated circuit 200 may turn off amplifiers allocated to the red sub pixel and at least one green sub pixel while sharing output of the amplifier of the blue sub pixel with the red sub pixel and the at least one green sub pixel. Since the above-described display driver integrated circuit 200 performs the above-described operation when the luminance of the display panel 160 is set at or below a specified value, power consumption may be reduced while at the same time compromises in screen performance is minimized.

According to one or more embodiments, the display driver integrated circuit 200 may reduce power consumption due to gamma generation by sharing at least some of gamma values to be supplied to sub pixels at a specified luminance. For example, in the RGGB pixel structure, the display driver integrated circuit 200 may share the gamma value of the first green sub pixel with the second green sub pixel and may omit generation of the gamma value for the second green sub pixel. Alternatively, in the RGGB pixel structure, the display driver integrated circuit 200 may reduce power consumed by gamma generation by sharing the gamma value of the blue sub pixel with other sub pixels and omitting generation of gamma values of the other sub pixels.

Environments suitable for the display panel 160 set at or below a specified luminance value may include an environment in which a user is not inconvenienced by the screen being at a low luminance. For example, the environment may include an environment in which at least one object having relatively monotonous color and shape is displayed in the display panel 160. The environment may also include an always on display (AOD) state in which the electronic device 100 always maintains a turn-on state. The environment may also include an environment in which a background screen of a single color (or colors of which the number is not more than a specified value) is output in the display panel 160 or in which only a specified object (e.g., a clock object, an object showing weather information, an object to display a received message (e.g., a chatting message, a character message, an e-mail message, or the like), an object to display a missed call, a schedule-related object, or the like) is displayed. The environment may also include when the luminance is manually adjusted by a user to be at or below a specified value. The environment may also include an environment in which an execution screen of an application, of which a specified luminance value is not more than a specified value, is output in the display panel 160. For example, an application execution screen may have a luminance setting of a specified value or less, and the number of dominant colors of the screen is not more than a given value and kinds or the number of objects outputted in the screen are not more than a given value. Such execution screens may include a document editor execution screen, a part of a chatting execution screen, or a part of an e-mail execution screen. Also, the environment may include an environment where luminance of the display panel 160 is lowered according to a detected external luminance. For example, in a dark room, the luminance of the display panel 160 may be lowered because high luminance is not required for the data displayed on the display panel 160 to be legible.

The display panel 160 may display data from the display driver integrated circuit 200. According to an embodiment, the display panel 160 may be implemented with a thin film transistor liquid crystal display (TFT-LCD) panel, a light-emitting diode (LED) display panel, an organic LED (OLED) display panel, an active-matrix OLED (AMOLED) display panel, a flexible display, or the like. For example, in the display panel 160, gate lines and source lines may be disposed in a matrix. A gate signal may be supplied to each gate line. According to an embodiment, a first gate signal may be supplied to each of odd-numbered gate lines among the gate lines, and a second gate signal may be supplied to each of even-numbered gate lines among the gate lines. The first gate signal and the second gate signal may include signals that are alternately supplied. Alternatively, after the first gate signal is sequentially supplied to the odd-numbered gate lines from a first gate line to a last gate line, the second gate signal may be sequentially supplied to the even-numbered gate lines. A signal corresponding to display data may be supplied to each source line. The signal corresponding to the display data may be supplied to a source driver under control of a timing controller of a logic circuit.

Figure 2:
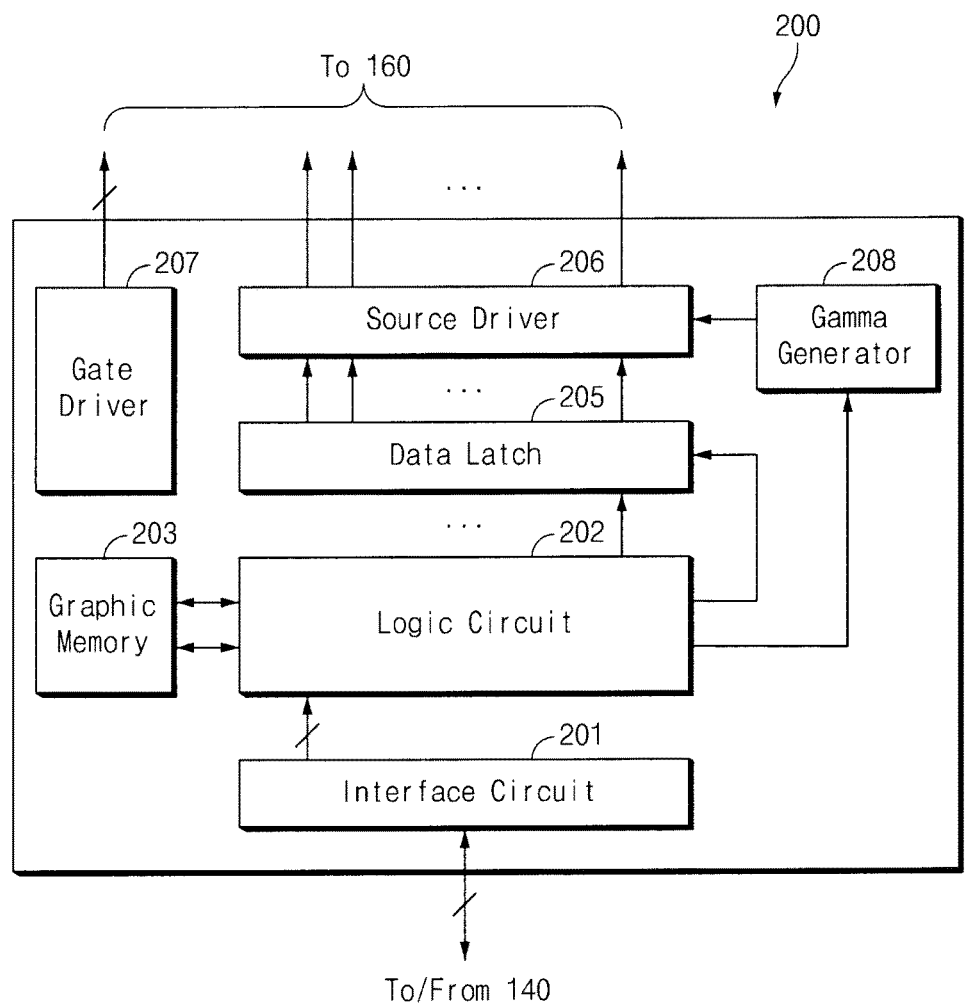
FIG. 2 is a diagram illustrating the display driver integrated circuit, according to an embodiment.

FIG. 2 is a diagram illustrating a display driver integrated circuit, according to an embodiment.

Referring to FIGS. 1 and 2, the display driver integrated circuit 200 may include an interface circuit 201, a logic circuit block 202, a graphic memory 203, a data latch (or shift register) 205, a source driver 206, a gate driver 207, and a gamma circuit 208.

The interface circuit 201 may interface signals or data exchanged between the processor 140 and the display driver integrated circuit 200. The interface circuit 201 may receive a line data from the processor 140 and may provide the line data to a graphics memory write controller of the logic circuit block 202. According to an embodiment, the interface circuit 201 may be an interface that relates to a serial interface such as a mobile industry processor interface (MIPI®), a mobile display digital interface (MDDI), a display port, an embedded DisplayPort (eDP), or the like.

The logic circuit block 202 may include a graphic memory write controller, a timing controller, a graphic memory read controller, an image processing unit, a source shift register controller, and a data shift register.

The graphic memory write controller of the logic circuit block 202 may control an operation of receiving line data from the interface circuit 201 and writing the received line data in the graphic memory 203.

The timing controller may supply a synchronizing signal and/or a clock signal to each element (e.g., a data comparison circuit or a graphic memory read controller) of the display driver integrated circuit 200. Also, the timing controller may provide the graphic memory read controller with a read command RCMD for controlling a read operation of the graphic memory 203. The timing controller may control timing of the source driver 206 to supply display data to the display panel 160. The timing controller may control timing of the gate driver 207 to output a gate signal. For example, the timing controller may control the gate driver 207 so that odd-numbered lines and even-numbered lines of display panel 160 receive synchronized gate signals.

According to an embodiment, the timing controller may control the generation of gamma values corresponding to the set luminance. For example, under control of the processor 140, the timing controller may control the source driver 206 such that outputs of some of a plurality of amplifiers allocated to a pixel are shared and used. Alternatively, under control of the processor 140, the timing controller may control the gamma circuit 208 such that some of gamma values for each sub pixel, which are to be provided to the display panel 160, are shared and used. Alternatively, the timing controller may provide the source driver 206 with a digital gamma value that the processor 140 provides.

According to an embodiment, on the basis of an analog gamma value of a specified sub pixel (e.g., blue or red) which is generated by the gamma circuit 208, the processor 140 or the timing controller may calculate a digital gamma value of any other sub pixel (e.g., red or green, or blue or green). The timing controller may provide the digital gamma value of the specified sub pixel to the source driver 206 through a signal line connected with the specified sub pixel. Through the above-described process, since the display driver integrated circuit 200 does not generate an analog gamma value of a specified sub pixel, the display driver integrated circuit 200 may save power and may apply the digital gamma value to the specified sub pixel.

The graphic memory read controller may perform a read operation on line data stored in the graphic memory 203. According to an embodiment, the graphic memory read controller may perform a read operation on all or a part of the line data stored in the graphic memory 203, based on a read command RCMD for line data. The graphic memory read controller may provide the image processing unit with all or a part of line data read from the graphic memory 203. The graphic memory write controller and the graphic memory read controller are described as being independent of each other for ease of description. However, the graphic memory write controller and the graphic memory read controller may be implemented with one graphic memory controller.

The image processing unit may improve an image quality by processing all of a part of line data from the graphic memory read controller. Display data, of which the image quality is improved, may be provided to the timing controller, and the timing controller may provide the display data to the source driver 206 through the data latch 205.

The source shift register controller may control a data shifting operation of the data shift register. According to an embodiment, the source shift register controller may control a line data write operation of the graphic memory 203, an image pre-processing operation of the image processing unit, and the like in response to an instruction from the processor 140.

The data shift register may shift display data provided through the source shift register controller under control of the source shift register controller. The data shift register may sequentially provide the shifted display data to the data latch 205.

The graphic memory 203 may store line data received through the graphic memory write controller under control of the graphic memory write controller. The graphic memory 203 may operate as a buffer memory in the display driver integrated circuit 200. According to an embodiment, the graphic memory 203 may include a graphic random access memory (GRAM).

The data latch 205 may store display data sequentially provided from the data shift register. The data latch 204 may output the stored display data to the source driver 206 in units of a horizontal line of the display panel 160.

The source driver 206 may provide the display panel 160 with line data from the data latch 205. According to an embodiment, the source driver 206 may include an amplifier connected for each sub pixel (or for each channel allocated to each sub pixel). Amplifiers included in the source driver 206 may be driven according to their corresponding pixels. For example, the amplifiers included in the source driver 206 may be grouped for each pixel (e.g., RGB sub pixels or RGGB sub pixels) to output a specified color (e.g., a white color or a black color). The source driver 206 may share an output of an amplifier allocated to a specified sub pixel with at least one other sub pixel in one pixel.

The source driver 206 may include a plurality of decoders each connected for each sub pixel. The decoder may be connected to the gamma circuit 208 and an output terminal of the logic circuit 202 and may decode (or multiply) display data from the logic circuit 202 and a gamma value that the gamma circuit 208 provides. An output of the decoder may be connected to an amplifier of sub pixels.

The source driver 206 may include at least one switch to transfer at least one gamma value generated from the gamma circuit 208 to a specified decoder. Also, the source driver 206 may include at least one switch that is provided to activate amplifiers connected for each sub pixel and to share an output of at least one amplifier. One or more switches included in the source driver 206 may be turned on or off in response to a control signal from the logic circuit 202 (e.g., the timing controller). As such, the source driver 206 may reduce power consumption by activating only some of the plurality of amplifiers allocated to a pixel. Alternatively, the source driver 206 may share an analog gamma value of a specified sub pixel, which the gamma circuit 208 provides, with at least one other decoder (any other decoder except for a decoder corresponding to a specified sub pixel).

The gate driver 207 may drive the gate lines of the display panel 160. That is, as operations of pixels in the display panel 160 are controlled by the source driver 206 and the gate driver 207, display data (or an image corresponding to the display data) from the processor 140 may be displayed in the display panel 160. Under control of the logic circuit 202, the gate driver 207 may classify the gate lines of the display panel 160 as odd-numbered lines or even-numbered lines and may alternatively supply a gate signal to each of the classified lines.

The gamma circuit 208 may generate and supply a gamma value (e.g. a gamma voltage corresponding to a gamma value) associated with the luminance of the display panel 160. The gamma circuit 208 may generate an analog gamma value corresponding to at least one of a first color (e.g., red), a second color (e.g., green), or a third color (e.g., blue) and may supply the analog gamma value to the source driver 206. An analog gamma value may be generated based on a gamma curve stored corresponding to a specified color. According to an embodiment, the gamma circuit 208 may generate analog gamma values for only some colors (e.g., red and green, blue and green, blue, or red) and may supply the analog gamma values to the source driver 206. In the case where the gamma circuit 208 generates and supplies an analog gamma value corresponding to one color, the logic circuit 202 may calculate a digital gamma value of another color based on an analog gamma value of a specified color and may supply the calculated digital gamma value to the source driver 206.

Figure 3:
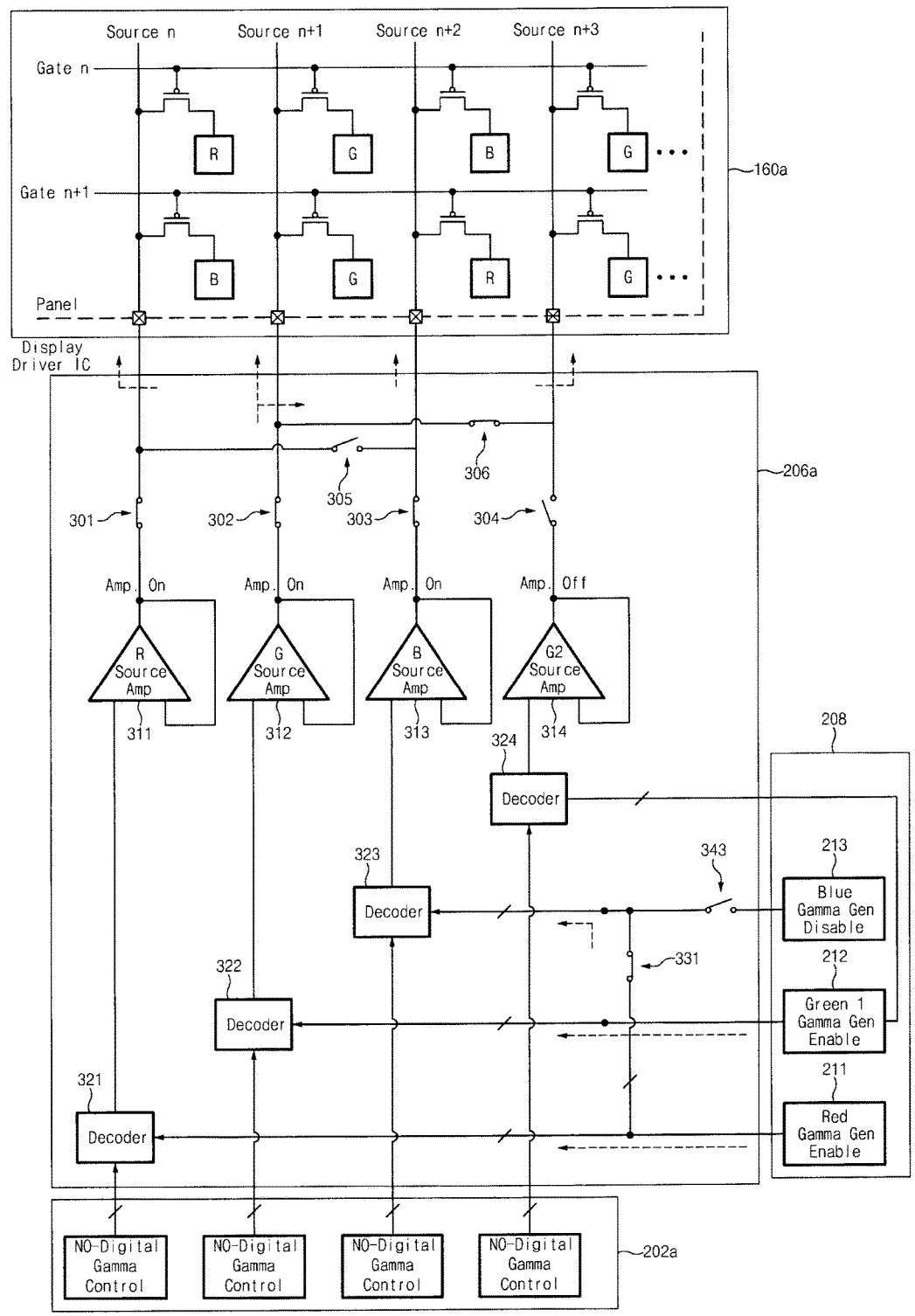
FIG. 3 is a diagram illustrating a part of a configuration of the electronic device including a pentile display panel, according to an embodiment of the present disclosure.

FIG. 3 is a diagram illustrating a part of a configuration of an electronic device including a pentile display panel, according to an embodiment of the present disclosure.

Referring to FIG. 3, the electronic device 100 may include a first pentile display panel 160a, a first source driver 206a, the gamma circuit 208, and a first logic circuit 202a.

For example, the first display panel 160a may include a display area in which a plurality of gate lines Gate n and Gate n+1 and four pentile source lines Source n, Source n+1, Source n+2, and Source n+3 are disposed. The first display panel 160a may further include a non-display area in which the first source driver 206a supplying display data to the pentile source lines Source n, Source n+1, Source n+2, and Source n+3 and the gate driver 207 supplying a gate signal to the gate lines Gate n and Gate n+1 are mounted. Alternatively, the above-described display driver integrated circuit 200 may be disposed in the non-display area of the first display panel 160a.

The gate lines Gate n and Gate n+1 may include, for example, odd-numbered gate lines Gate n and even-numbered gate lines Gate n+1. The odd-numbered gate lines Gate n and the even-numbered gate lines Gate n+1 may be alternately supplied with a gate signal. According to an embodiment, in the odd-numbered gate lines Gate n, RGBG sub pixels may constitute one pixel and may be iteratively disposed for multiple pixels. In the even-numbered gate lines Gate n+1, BGRG sub pixels may constitute one pixel and may be iteratively disposed for multiple pixels.

The pentile source lines Source n, Source n+1, Source n+2, and Source n+3 may include a first channel Source n for alternatively-disposed red sub pixel and blue sub pixel, a second channel Source n+1 for first green sub pixels, a third channel Source n+2 for alternatively-disposed blue sub pixel and red sub pixel, and a fourth channel Source n+3 for second green sub pixels. The above-described pentile source lines Source n, Source n+1, Source n+2, Source n+3 may be for a group of four sub pixels that constitute one pixel. Pads that are connected with output terminals of amplifiers of the first source driver 206a may be disposed on one side of the first display panel 160a, for example, channels ends of the pentile source lines Source n, Source n+1, Source n+2, and Source n+3.

For example, with regard to the pentile source lines Source n, Source n+1, Source n+2, and Source n+3, the first source driver 206a may include a first amplifier 311 supplying a signal to the first channel Source n, a second amplifier 312 supplying a signal to the second channel Source n+1, a third amplifier 313 supplying a signal to the third channel Source n+2, and a fourth amplifier 314 supplying a signal to the fourth channel Source n+3. Also, the first source driver 206a may include a first switch 301 connected to an output terminal of the first amplifier 311, a second switch 302 connected to an output terminal of the second amplifier 312, a third switch 303 connected to an output terminal of the third amplifier 313, a fourth switch 304 connected to an output terminal of the fourth amplifier 314, a fifth switch 305 disposed between the output terminal of the first amplifier 311 and the output terminal of the third amplifier 313, and a sixth switch 306 disposed between the output terminal of the second amplifier 312 and the output terminal of the fourth amplifier 314. For example, a control signal of each of the switches 301 to 306 may be provided from the timing controller that receives a control signal of the processor 140. The first source driver 206a may include a first decoder 321 disposed at an input terminal of the first amplifier 311, a second decoder 322 disposed at an input terminal of the second amplifier 312, a third decoder 323 disposed at an input terminal of the third amplifier 313, and a fourth decoder 324 disposed at an input terminal of the fourth amplifier 314.

The first, second, third, and fourth decoders 321, 322, 323, and 324 may receive display data and a digital gamma value from the first logic circuit 202a. Also, the first, second, third, and fourth decoders 321, 322, 323, and 324 may receive outputs of the gamma circuit 208.

The gamma circuit 208 may include a first gamma generation unit 211 that generates an analog gamma value associated with a color of the first sub pixel (e.g., a red sub pixel) and supplies the analog gamma value to the first decoder 321, a second gamma generation unit 212 that generates an analog gamma value associated with a color of the second sub pixel and the fourth sub pixel (e.g., a green sub pixel) and supplies the analog gamma value to the second decoder 322 and the fourth decoder 324, and a third gamma generation unit 213 that generates an analog gamma value associated with a color of the third sub pixel (e.g., a blue sub pixel) and supplies the analog gamma value to the third decoder 323.

The first source driver 206a may include a gamma output adjustment switch 343 disposed between an output terminal of the third gamma generation unit 213 and the third decoder 323 and a gamma value sharing switch 331 disposed between an output terminal of the first gamma generation unit 211 and the third decoder 323.

The first logic circuit 202a may supply display data to be supplied to the pentile source lines Source n, Source n+1, Source n+2, and Source n+3 to the first, second, third, and fourth decoders 321, 322, 323, and 324 disposed for each channel. One pixel (e.g., a group of RGBG sub pixels) is above exemplified. In the first display panel 160a in which a plurality of pixels are disposed, the first logic circuit 202a may supply display data to pentile source lines corresponding to each pixel.

In the display driver integrated circuit 200 of the above-described structure, the display driver integrated circuit 200 may supply an output of the first amplifier 311 to an output of the third amplifier 313 under control of the first logic circuit 202a. In this regard, the first logic circuit 202a may control activation of the first amplifier 311 and close the first switch 301 while supplying display data associated with the first channel Source n to the first decoder 321. The first logic circuit 202a may control activation of the second amplifier 312, deactivation of the fourth amplifier 314, and close the second switch 302 and the sixth switch 306 while supplying display data associated with the second channel Source n+1 to the second decoder 322. This way, output of the amplifier 312 is shared with the fourth amplifier 314, so that the fourth channel Source n+3 may be driven even though the fourth amplifier is deactivated. The first logic circuit 202a may control activation of the third amplifier 313 and close the third switch 303 while supplying display data associated with the third channel Source n+2 to the third decoder 323.

As described above, the first logic circuit 202a may activate any one of amplifiers (e.g., the second amplifier 312 or the fourth amplifier 314) allocated to drive sub pixels of the same color and may share an output of the activated amplifier; the first logic circuit 202a may deactivate the other amplifier (e.g., the fourth amplifier 314 or the second amplifier 312). As such, the display driver integrated circuit 200 may reduce power needed to drive amplifiers corresponding to sub pixels of the same color. The first logic circuit 202a may control the above-described switching operations and amplifier activation operations based on settings (or under control of the processor 140) while display data is outputted when the first display panel 160a is set to a specified luminance or lower. In the case of outputting a screen exceeding the specified luminance, the first logic circuit 202a may activate all amplifiers (e.g., the first, second, third, and fourth amplifiers 311, 312, 313, and 314) allocated to one pixel.

The operation of controlling amplifiers and switches may be performed by an instruction that is written in the source shift register controller after being received from the processor 140. The instruction written in the source shift register controller may be provided to the timing controller, and the timing controller may perform a data transfer operation according to execution of the instruction. Display data provided from the first logic circuit 202a may be, for example, 8-bit display data, and a grayscale voltage to be supplied to each decoder from the gamma circuit 208 may be, for example, a 256-grayscale voltage. The number of display data and the number of grayscale voltages may be changed according to the specification of the first display panel 160a.

According to one or more embodiments, the first logic circuit 202a may share an analog gamma value, thereby reducing power consumed to generate and supply an analog gamma value. For example, the first logic circuit 202a may turn on the gamma value sharing switch 331 such that a first gamma value generated by the first gamma generation unit 211 is simultaneously supplied to the first decoder 321 and the third decoder 323. In this operation, the first logic circuit 202a may turn off (or deactivate) the third gamma generation unit 213, thereby reducing power consumed to operate the third gamma generation unit 213.

The first logic circuit 202a may selectively perform at least one operation of activating some of amplifiers and sharing an output of one amplifier and activating some of the gamma generation units and sharing an output of one gamma generation unit. According to an embodiment, the first logic circuit 202a may store setting values associated with a plurality of luminance levels and may selectively perform these power-saving operations based on the luminance value currently set in the first display panel 160a. In the luminance is relatively low, the first logic circuit 202a may perform the operations of sharing an output of an amplifier and sharing a gamma value at the same time.

In the above-described gamma value generating operation, the first logic circuit 202a may deactivate the first gamma generation unit 211 and may activate the third gamma generation unit 213. The first logic circuit 202a may close the gamma value sharing switch 331 and the gamma output adjustment switch 343 such that an output of the third gamma generation unit 213 is supplied to the first decoder 321 and the third decoder 323. According to an embodiment, since red and blue contribute relatively less to the luminance of a pixel than green, due to the relatively higher frequency band or high energy of green, even though gamma values associated with the red color sub pixel and the blue color sub pixel are shared, the luminance of the first display panel 160a may be maintained effectively (to such an extent that a user does not feel (or that a user does not recognize a large difference) in luminance of the display) while power consumption decreases.

According to one or more embodiments, the gamma circuit 208 is described as including three gamma generation units respectively corresponding to sub pixels. However, embodiments of the present disclosure may not be limited thereto. For example, the gamma circuit 208 may not include the third gamma generation unit 213. In this case, a design may be made such that the gamma output adjustment switch 343 is removed and signal lines corresponding to the gamma output adjustment switch 343 are connected. In this case, the first display panel 160a may display three colors, and the gamma circuit 208 may generate two gamma values and may supply the generated gamma values to the first source driver 206a.

Figure 4:
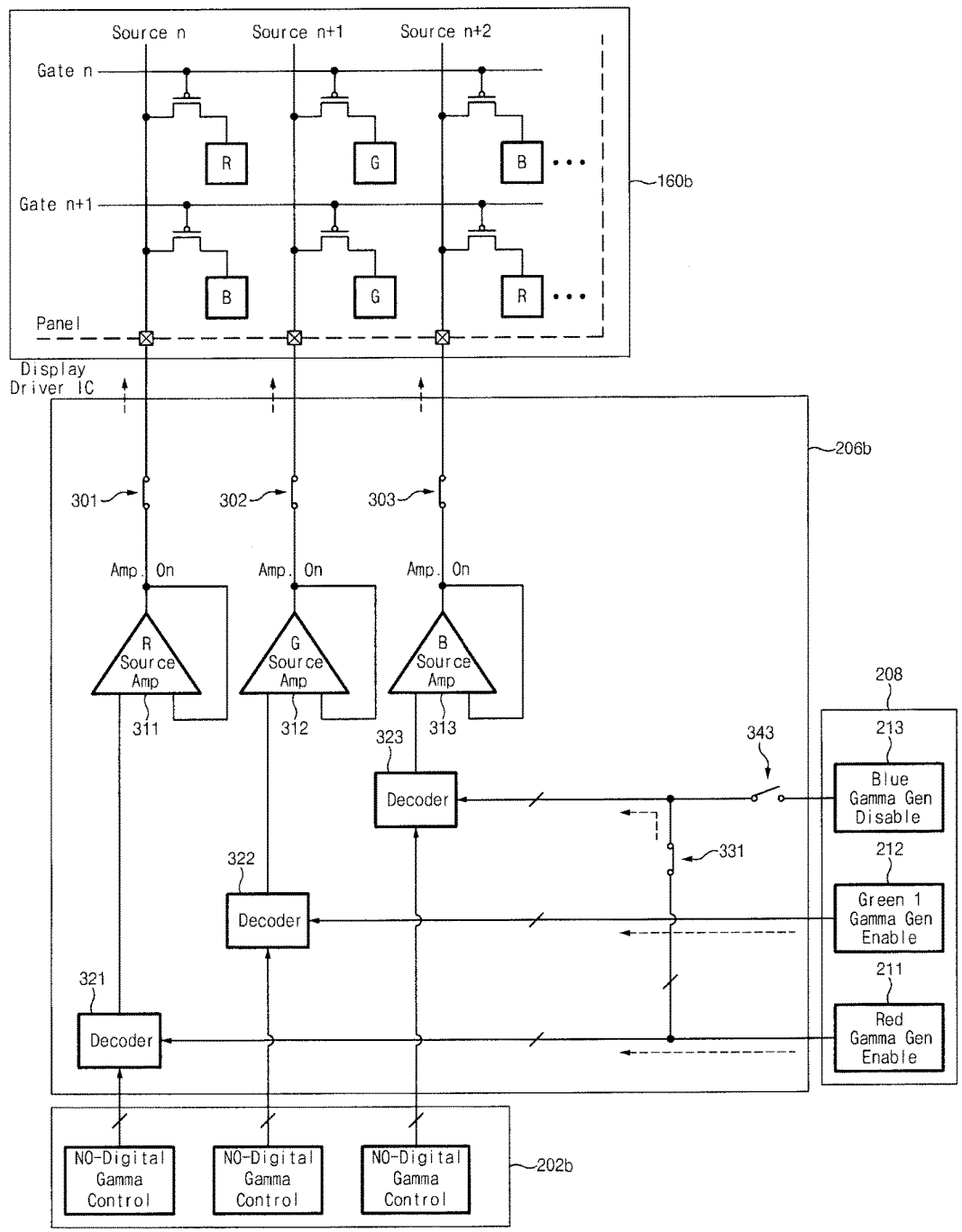
FIG. 4 is a diagram illustrating a part of a configuration of the electronic device including a second display panel of stripe layout type, according to an embodiment of the present disclosure.

FIG. 4 is a diagram illustrating a part of a configuration of an electronic device including a second display panel of a stripe layout type, according to an embodiment of the present disclosure.

Referring to FIG. 4, the electronic device 100 may include a second display panel 160b of stripe layout type, a second source driver 206b, the gamma circuit 208, and a second logic circuit 202b.

For example, the second display panel 160b of the stripe layout type may include a display area in which a plurality of gate lines Gate n and Gate n+1 and three stripe source lines Source n, Source n+1, and Source n+2 are disposed. The second display panel 160b may further include a non-display area in which the second source driver 206b supplying display data to the stripe source lines Source n, Source n+1, and Source n+2 and the gate driver 207 supplying a gate signal to the gate lines Gate n and Gate n+1 are mounted. In a pixel of the second display panel 160b of the stripe layout type, three-color, that is, RGB sub pixels may be grouped.

The gate lines Gate n and Gate n+1 may include, for example, odd-numbered gate lines Gate n and even-numbered gate lines Gate n+1. The odd-numbered gate lines Gate n and the even-numbered gate lines Gate n+1 may be alternately supplied with a gate signal. According to an embodiment, in the odd-numbered gate lines Gate n, RGB sub pixels may constitute one pixel and may be iteratively disposed for multiple pixels. In the even-numbered gate lines Gate n+1, BGR sub pixels may constitute one pixel and may be iteratively disposed for multiple pixels.

The stripe source lines Source n, Source n+1, and Source n+2 may include a first channel Source n for alternatively-disposed blue sub pixel and red sub pixel, a second channel Source n+1 for green sub pixels, and a third channel Source n+2 for alternatively-disposed red sub pixel and blue sub pixel. The stripe source lines Source n, Source n+1, and Source n+2 may be for a group of three sub pixels that constitute one pixel. Pads that are connected with output terminals of amplifiers of the second source driver 206b may be disposed on one side of the second display panel 160b, for example, channels ends of the stripe source lines Source n, Source n+1, and Source n+2.

For example, with regard to the stripe source lines Source n, Source n+1, and Source n+2, the second source driver 206b may include the first amplifier 311 supplying a signal to the first channel Source n, the second amplifier 312 supplying a signal to the second channel Source n+1, and the third amplifier 313 supplying a signal to the third channel Source n+2. Also, the second source driver 206b may include the first switch 301 connected to an output terminal of the first amplifier 311, the second switch 302 connected to an output terminal of the second amplifier 312, and the third switch 303 connected to an output terminal of the third amplifier 313. For example, a control signal of each of the switches 301 to 303 may be provided from the timing controller that receives a control signal of the processor 140. The second source driver 206b may include the first decoder 321 disposed at an input terminal of the first amplifier 311, the second decoder 322 disposed at an input terminal of the second amplifier 312, and the third decoder 323 disposed at an input terminal of the third amplifier 313. Each of the first, second, and third decoders 321, 322, and 323 may receive display data from the second logic circuit 202b. Also, the first, second, and third decoders 321, 322, and 323 may receive some of color gamma values of the gamma circuit 208 (e.g., an output of the first gamma generation unit 211 and an output of the second gamma generation unit 212).

For example, the gamma circuit 208 may include the first gamma generation unit 211 that generates an analog gamma value associated with a color of a first sub pixel (e.g., a red sub pixel) and supplies the analog gamma value to the first decoder 321, the second gamma generation unit 212 that generates an analog gamma value associated with a color of a second sub pixel (e.g., a green sub pixel) and supplies the analog gamma value to the second decoder 322, and a third gamma generation unit 213 that generates an analog gamma value associated with a color of a third sub pixel (e.g., a blue sub pixel) and supplies the analog gamma value to the third decoder 323.

The second source driver 206b may include the gamma value sharing switch 331 disposed between an output terminal of the first gamma generation unit 211 and the third decoder 323 and the gamma output adjustment switch 343 disposed between an output terminal of the third gamma generation unit 213 and the third decoder 323.

The second logic circuit 202b may supply display data to be supplied to the stripe source lines Source n, Source n+1, and Source n+2 to the first, second, and third decoders 321, 322, and 323 disposed for each channel. One pixel (e.g., a group of RGB sub pixels) is above exemplified. In the second display panel 160b in which a plurality of pixels are disposed, the second logic circuit 202b may supply display data to source lines corresponding to each pixel.

According to one or more embodiments, the second logic circuit 202b may share an analog gamma value, thereby reducing power consumed to generate and supply an analog gamma value. For example, the second logic circuit 202b may close the gamma value sharing switch 331 such that a first gamma value generated by the first gamma generation unit 211 is simultaneously supplied to the first decoder 321 and the third decoder 323. In this operation, the second logic circuit 202b may turn off (or deactivate) the third gamma generation unit 213, thereby reducing power consumed to operate the third gamma generation unit 213.

Figure 5:
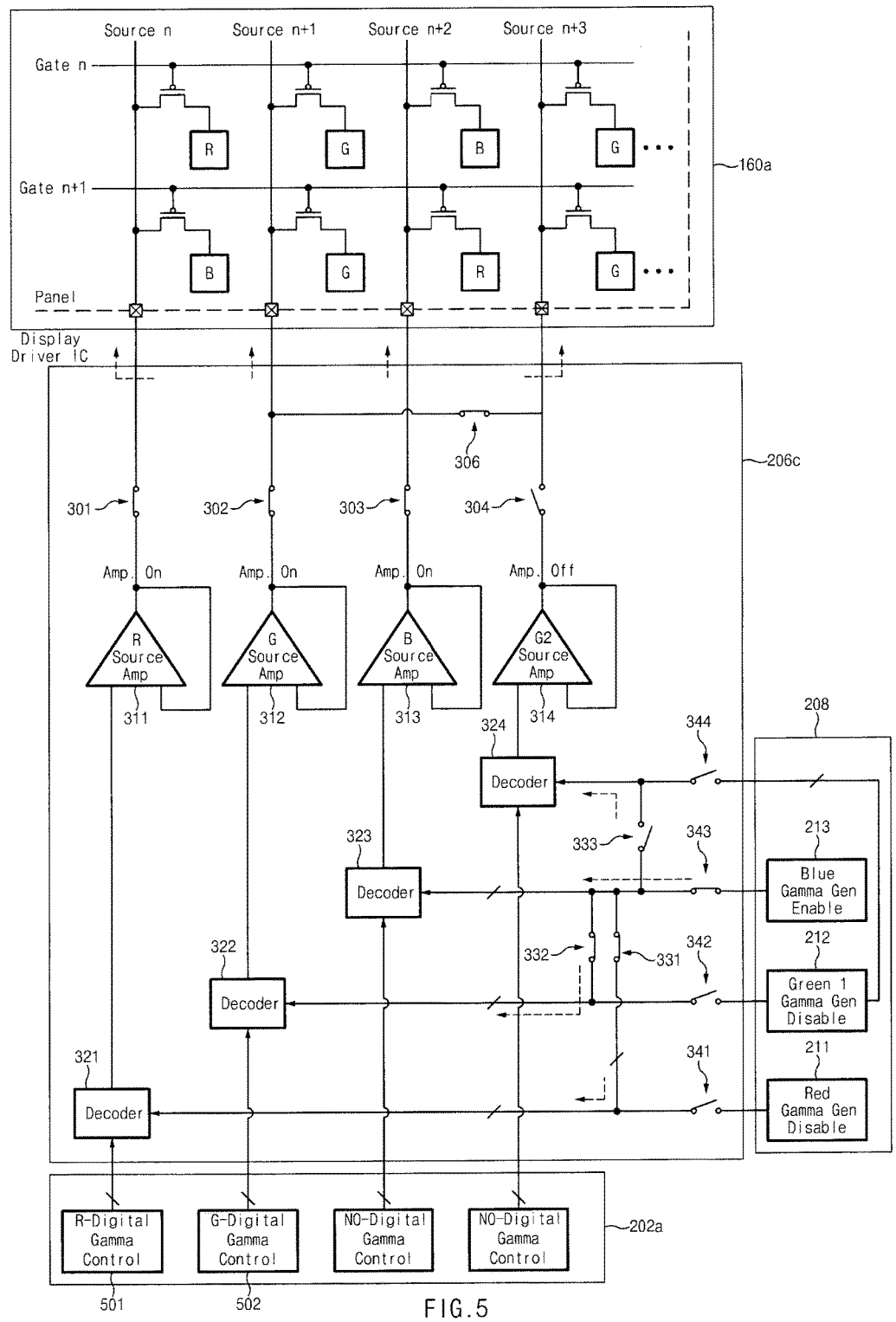
FIG. 5 is a diagram illustrating a part of a configuration of the electronic device including the pentile display panel, according to another embodiment of the present disclosure.

FIG. 5 is a diagram illustrating a part of a configuration of an electronic device including a pentile display panel, according to another embodiment of the present disclosure.

Referring to FIG. 5, a part of a configuration of the electronic device 100 may include the first pentile display panel 160a, a third source driver 206c, the gamma circuit 208, and the first logic circuit 202a. The first display panel 160a, the gamma circuit 208, and the first logic circuit 202a may be configured to be substantially similar to the first display panel, the gamma circuit, and the first logic circuit described with reference to FIG. 3. As such, differences between FIG. 3 and FIG. 5 for the above-described elements will be described below.

The third source driver 206c may include the first, second, third, and fourth amplifiers 311, 312, 313, and 314, the first, second, third, and fourth switches 301, 302, 303, and 304, the sixth switch 306, and the first, second, third, and fourth decoders 321, 322, 323, and 324. Also, the third source driver 206c may include a first gamma output adjustment switch 341 disposed between an output terminal of the first gamma generation unit 211 included in the gamma circuit 208 and the first decoder 321, a second gamma output adjustment switch 342 disposed between an output terminal of the second gamma generation unit 212 and the second decoder 322, the third gamma output adjustment switch 343 disposed between an output terminal of the third gamma generation unit 213 and the third decoder 323, and a fourth gamma output adjustment switch 344 disposed between an output terminal of the second gamma generation unit 212 and the fourth decoder 324. Also, the third source driver 206c may include the first gamma value sharing switch 331 disposed between an output terminal of the third gamma generation unit 213 and an input terminal of the first decoder 321, a second gamma value sharing switch 332 disposed between the output terminal of the third gamma generation unit 213 and an input terminal of the second decoder 322, and a third gamma value sharing switch 333 disposed between the output terminal of the third gamma generation unit 213 and an input terminal of the fourth decoder 324.

With regard to drive an electronic device of the above-described configuration, the first logic circuit 202a may turn on the sixth switch 306 such that an output of the second amplifier 312 is supplied to the second channel Source n+1 and the fourth channel Source n+3. In this operation, the first logic circuit 202a may deactivate the fourth amplifier 314, thereby reducing power consumed to operate the amplifier 314.

According to one or more embodiments, the first logic circuit 202a may activate the third gamma generation unit 213 (e.g., generation of a blue color gamma value) of the gamma circuit 208 and may deactivate the first gamma generation unit 211 and the second gamma generation unit 212. Under control of the first logic circuit 202a, the first gamma output adjustment switch 341, the second gamma output adjustment switch 342, and the fourth gamma output adjustment switch 344 may be opened, and the first gamma value sharing switch 331 and the second gamma value sharing switch 332 may be closed. Also, the third gamma value sharing switch 333 may be closed under control of the first logic circuit 202a. As such, an analog gamma value generated by the third gamma generation unit 213 may be supplied to the first decoder 321, the second decoder 322, and the third decoder 323. As described above, the display driver integrated circuit 200 may reduce power consumption of the gamma circuit 208 by ⅔, by deactivating the first gamma generation unit 211 and the second gamma generation unit 212. Also, under control of the first logic circuit 202a, the second switch 302 and sixth switch 306 may be closed while the fourth switch 304 is opened. At the same time, the fourth amplifier 314 may be deactivated and the output of the second amplifier 312 may be shared with the output terminal of the fourth amplifier 314 to drive the fourth channel Source n+3. Accordingly, the display driver integrated circuit 200 may reduce power consumption of the amplifier units by ¼ by deactivating the fourth amplifier 314, compared with the case where four amplifiers are activated and operated.

According to an embodiment, the first logic circuit 202a may include circuits that are capable of supplying digital gamma values to the first, second, third, and fourth decoders 321, 322, 323, and 324 and may supply each of the decoders with a digital gamma value of the corresponding channel under control of the processor 140 or the timing controller. In this regard, the first logic circuit 202a (or the processor 140) may set an analog gamma value from the third gamma generation unit 213 to a maximum grayscale voltage and may calculate grayscale gamma voltages of other colors (e.g., green and red) by using a gamma value graph. The calculated digital gamma values may be respectively supplied to the corresponding decoders. An embodiment is illustrated in FIG. 5 as a first digital gamma value 501 is supplied to the first decoder 321 and a second digital gamma value 502 is supplied to the second decoder 322. The first decoder 321 may decode the first digital gamma value 501 and the third gamma value, which the third gamma generation unit 213 provides, and may supply the decoded result to the first amplifier 311. The second decoder 322 may decode the second digital gamma value 502 and the third gamma value, which the third gamma generation unit 213 provides, and may supply the decoded result to the second amplifier 312. The first logic circuit 202a may deactivate the fourth amplifier 314 while an output of the second amplifier 312 is supplied to the fourth channel Source n+3.

As described above, according to an embodiment of the present disclosure, the display driver integrated circuit 200 and the electronic device 100 may reduce power needed to operate the gamma circuit 208 in low luminance mode (i.e. when the set luminance of the first display panel 160a is not more than a specified value), compared with the case where analog gamma values are generated for each color. Also, since influence of red and blue on the whole luminance is relatively less than influence of green on the whole luminance, even though an output value of an amplifier of a blue channel is applied to a red channel, power consumption may be minimized while any decrease in luminance is minimized.

The above-described amplifier output sharing operation and gamma value sharing operation may be performed in the case where the electronic device 100 is configured to output a screen of specified luminance or less, for example, in the case where a user input is generated such that a specified luminance or less is set.

Figure 6:
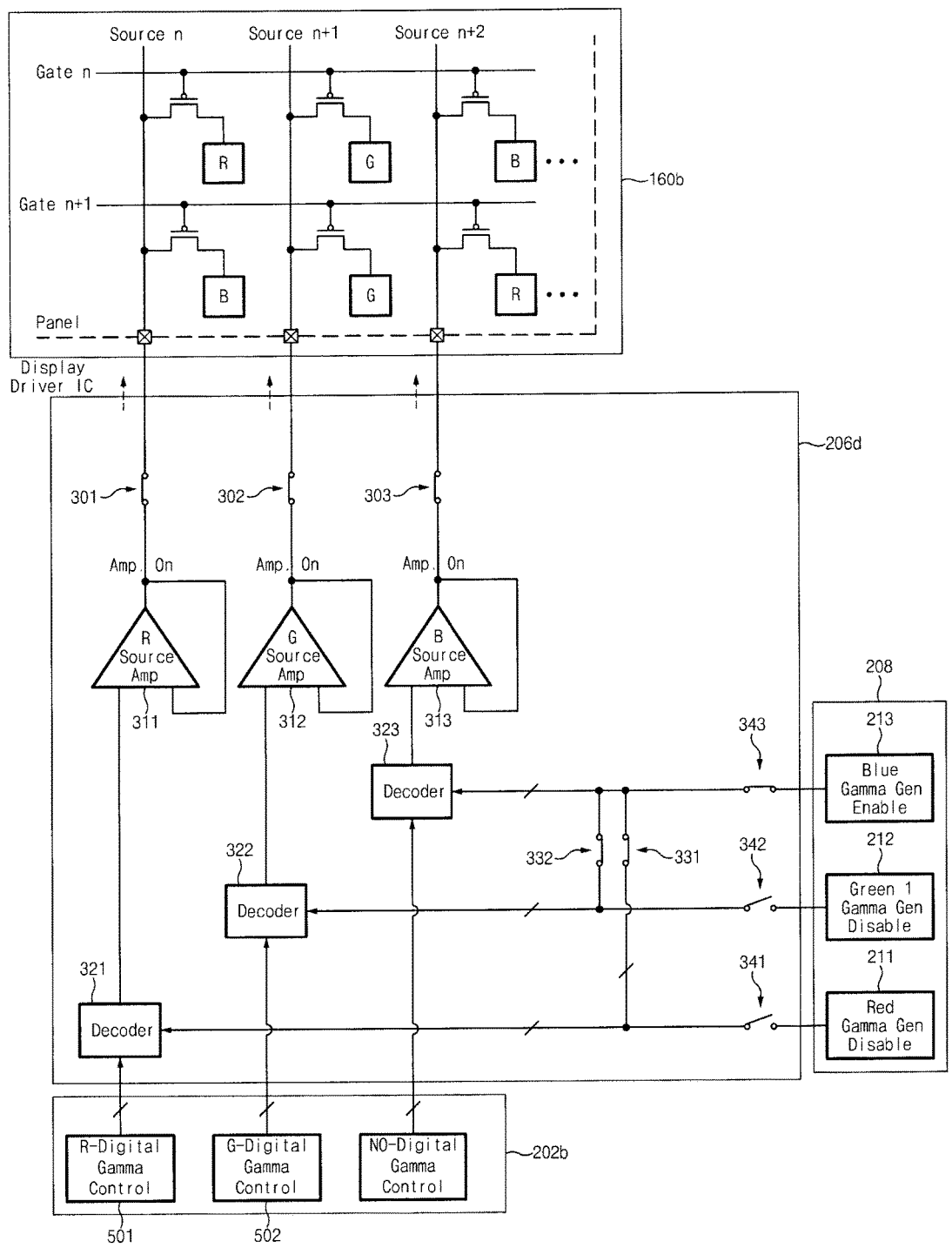
FIG. 6 is a diagram illustrating a part of a configuration of the electronic device including the second display panel of the stripe layout type, according to another embodiment of the present disclosure.

FIG. 6 is a diagram illustrating a part of a configuration of an electronic device including a second display panel of a stripe layout type, according to another embodiment of the present disclosure.

Referring to FIG. 6, the electronic device 100 may include the second display panel 160b of the stripe layout type, a fourth source driver 206d, the gamma circuit 208, and the second logic circuit 202b. The second display panel 160b, the gamma circuit 208, and the second logic circuit 202b may be configured to be similar to the second display panel, the gamma circuit, and the second logic circuit described with reference to FIG. 4. Accordingly, differences between the gamma circuit 208 and the second logic circuit 202b of FIG. 6 and the gamma circuit and the second logic circuit of FIG. 4 will be described below.

The fourth source driver 206d may include the first, second, and third amplifiers 311, 312, and 313 and the first, second, and third switches 301, 302, and 303. For example, a control signal of each of the switches 301 to 303 may be provided from the timing controller that receives a control signal of the processor 140. While display data are output to a display panel, the first, second, and third amplifiers 311, 312, and 313 may have an enable state, and the first, second, and third switches 301, 302, and 303 may be closed.

The fourth source driver 206d may include the first, second, and third decoders 321, 322, and 323. The fourth source driver 206d may include the first gamma output adjustment switch 341 disposed between an output terminal of the first gamma generation unit 211 and the first decoder 321, the second gamma output adjustment switch 342 disposed between an output terminal of the second gamma generation unit 212 and the second decoder 322, and the third gamma output adjustment switch 343 disposed between an output terminal of the third gamma generation unit 213 and the third decoder 323. Also, the fourth source driver 206d may include the gamma value sharing switch 331 disposed between the output terminal of the third gamma generation unit 213 and an input terminal of the first decoder 321 and the second gamma value sharing switch 332 disposed between the output terminal of the third gamma generation unit 213 and an input terminal of the second decoder 322.

The first, second, and third decoders 321, 322, and 323 may receive display data and a digital gamma value from the second logic circuit 202b. For example, the first decoder 321 may receive the first digital gamma value 501 from the second logic circuit 202b, and the second decoder 322 may receive the second digital gamma value 502 from the second logic circuit 202b. Also, each of the first, second, and third decoders 321, 322, and 323 may receive a third gamma value that the third gamma generation unit 213 generates.

The display driver integrated circuit 200 of the above-described configuration and the electronic device 100 including the same may activate a gamma generation unit (e.g., the third gamma generation unit 213) of the gamma circuit 208, which is associated with a gamma value of one color, and may not generate gamma values associated with the remaining colors. Accordingly, it may be possible to relatively reduce power needed to operate the gamma circuit 208 compared with a situation in which gamma values of all colors are generated. In this operation, according to an embodiment of the present disclosure, a screen that is similar to that of an environment in which an analog gamma value is applied may be provided by providing digital gamma values to channels, respectively.

Figure 7:
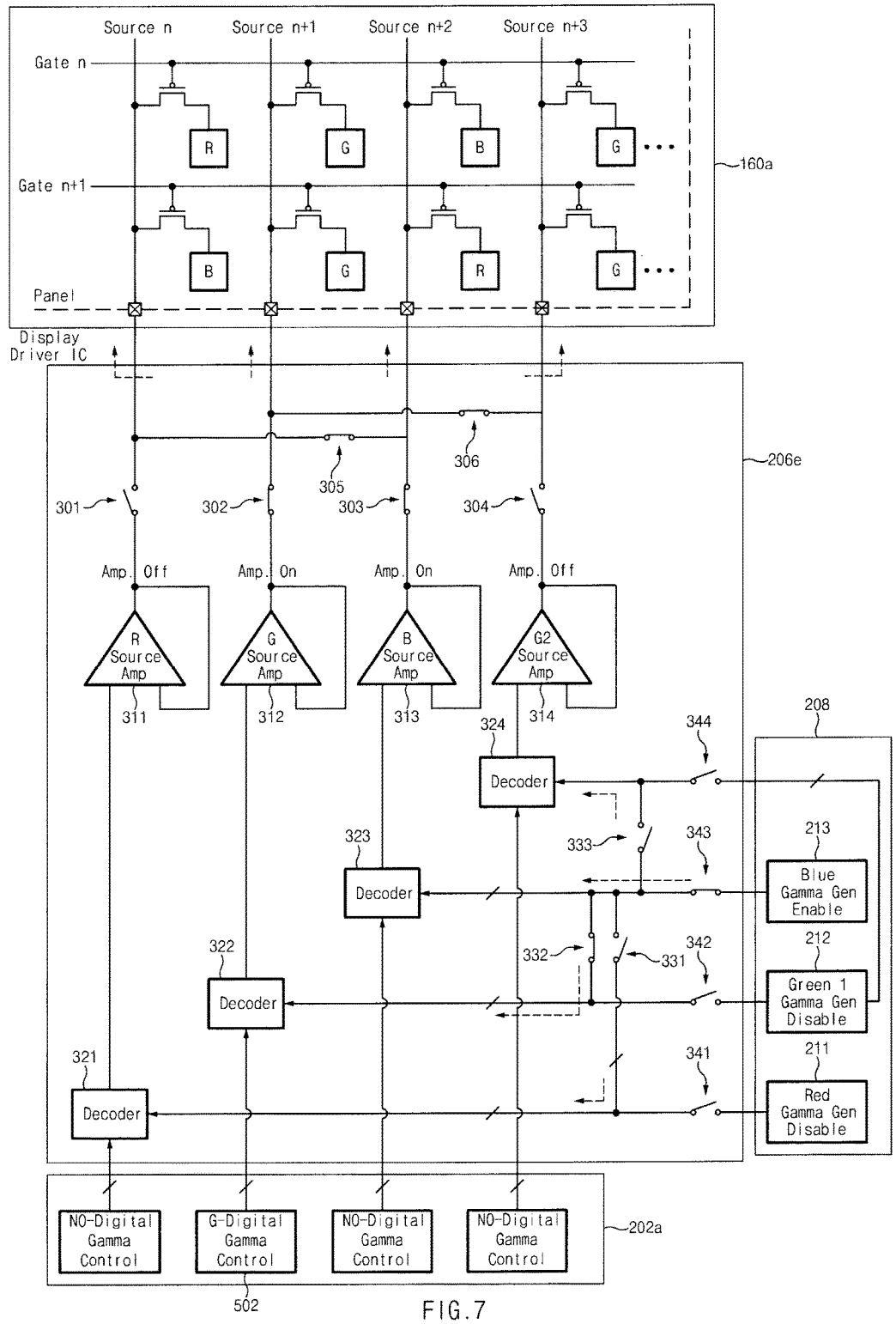
FIG. 7 is a diagram illustrating a part of a configuration of the electronic device including the pentile display panel, according to another embodiment of the present disclosure.

FIG. 7 is a diagram illustrating a part of a configuration of an electronic device including a pentile display panel, according to another embodiment of the present disclosure.

Referring to FIG. 7, the electronic device 100 may include the first display panel 160a of the pentile type, a fifth source driver 206e, the gamma circuit 208, and the first logic circuit 202a. The first display panel 160a, the gamma circuit 208, and the first logic circuit 202a may be configured to be similar to as the first display panel, the gamma circuit, and the first logic circuit described with reference to FIG. 3 or 5. As such, differences between the embodiments in FIGS. 5 and 7 with respect to the above-described elements will be described below.

The fifth source driver 206e may include the first, second, third, and fourth amplifiers 311, 312, 313, and 314, the first, second, third, fourth, fifth, and sixth switches 301, 302, 303, 304, 305, and 306, and the first, second, third, and fourth decoders 321, 322, 323, and 324. Also, the fifth source driver 206e may include the first gamma output adjustment switch 341 disposed between the first gamma generation unit 211 and the first decoder 321, the second gamma output adjustment switch 342 disposed between the second gamma generation unit 212 and the second decoder 322, the third gamma output adjustment switch 343 disposed between the third gamma generation unit 213 and the third decoder 343, and the fourth gamma output adjustment switch 344 disposed between the second gamma generation unit 212 and the fourth decoder 324. Also, the fifth source driver 206e may include the first gamma value sharing switch 331 disposed between an output terminal of the third gamma generation unit 213 and an input terminal of the first decoder 321, the second gamma value sharing switch 332 disposed between the output terminal of the third gamma generation unit 213 and an input terminal of the second decoder 322, and the third gamma value sharing switch 333 disposed between the output terminal of the third gamma generation unit 213 and an input terminal of the fourth decoder 324.

With regard to drive an electronic device of the above-described configuration, the first logic circuit 202a may close the fifth switch 305 such that an output of the third amplifier 313 is supplied to the first channel Source n and the third channel Source n+2. The first logic circuit 202a may turn on the sixth switch 306 such that an output of the second amplifier 312 is supplied to the second channel Source n+1 and the fourth channel Source n+3. In this operation, the first logic circuit 202a may deactivate the first amplifier 311 and the fourth amplifier 314, thereby reducing power consumed to operate the amplifiers (e.g., power consumption is reduced by 50% compared with a situation in which four amplifiers are used). Under control of the first logic circuit 202a, the first switch 301 and the fourth switch 304 may be opened, and the second switch 302 and the third switch 303 may be closed.

According to one or more embodiments, the first logic circuit 202a may activate the third gamma generation unit 213 (e.g., generation of a blue color gamma value) of the gamma circuit 208 and may deactivate the first gamma generation unit 211 and the second gamma generation unit 212. Under control of the first logic circuit 202a, the first gamma output adjustment switch 341, the second gamma output adjustment switch 342, and the fourth gamma output adjustment switch 344 may be opened, and the third gamma output adjustment switch 343 and the second gamma value sharing switch 332 may be closed. The first gamma value sharing switch 331 and the third gamma value sharing switch 333 may be opened under control of the first logic circuit 202a. As such, an analog gamma value generated by the third gamma generation unit 213 may be supplied to the second decoder 322 and the third decoder 323. The second digital gamma value 502 (e.g., a green digital gamma value) may be supplied to the second decoder 322 from the first logic circuit 202a.

As described above, the display driver integrated circuit 200 may reduce power consumption of the gamma circuit by ⅔, by deactivating the first gamma generation unit 211 and the second gamma generation unit 212 and may reduce power consumption of the amplifiers by 50% by deactivating the first amplifier 311 and the fourth amplifier 314.

Figure 8:
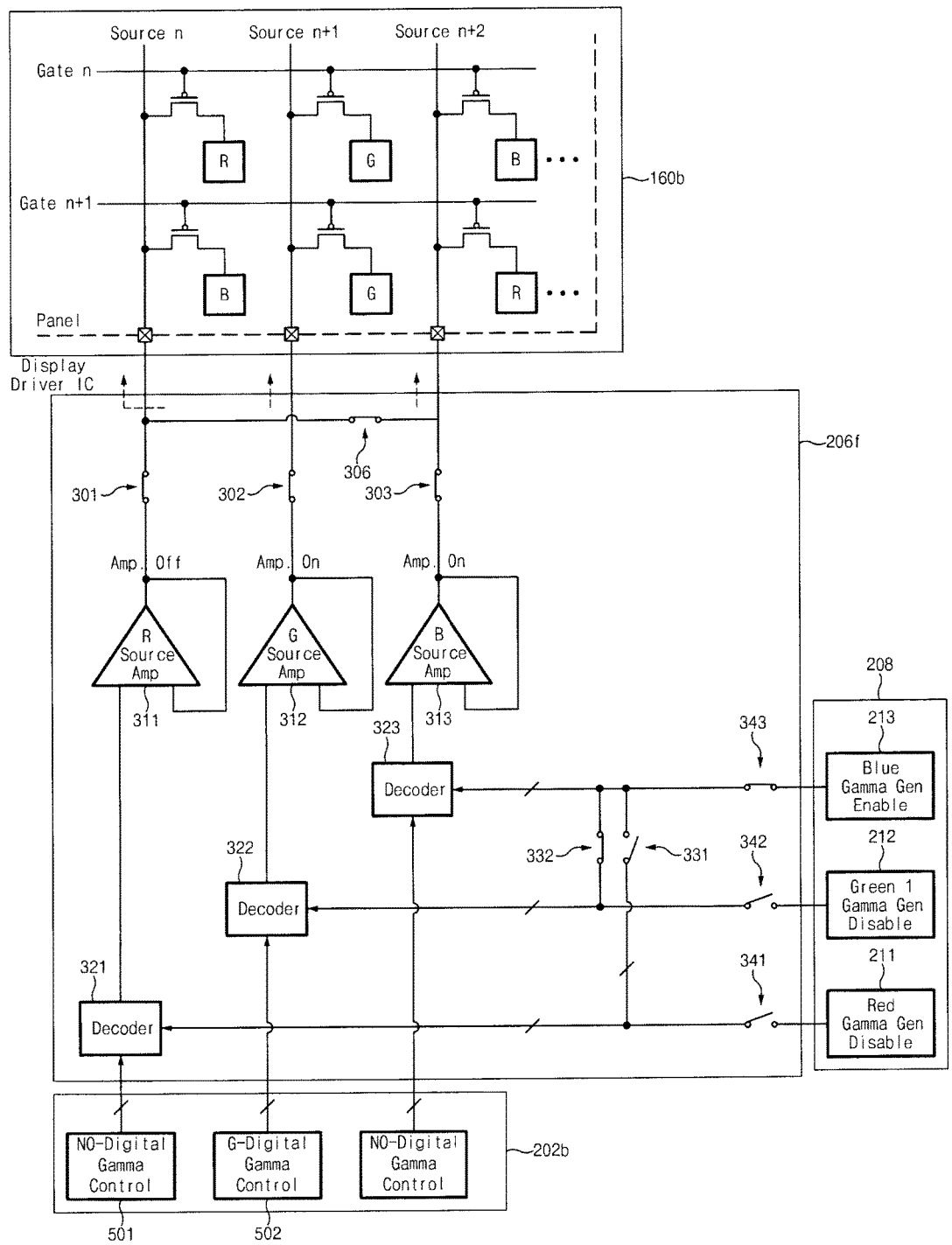
FIG. 8 is a diagram illustrating a part of a configuration of the electronic device including the second display panel of the stripe layout type, according to another embodiment of the present disclosure.

FIG. 8 is a diagram illustrating a part of a configuration of an electronic device including a second display panel of a stripe layout type, according to another embodiment of the present disclosure.

Referring to FIG. 8, the electronic device 100 may include the second display panel 160b of the stripe layout type, a sixth source driver 206f, the gamma circuit 208, and the second logic circuit 202b. The second display panel 160b, the gamma circuit 208, and the second logic circuit 202b may be configured to be similar to the second display panel, the gamma circuit, and the second logic circuit described with reference to FIG. 6. Accordingly, differences between the gamma circuit 208 and the second logic circuit 202b of FIG. 8 and the gamma circuit and the second logic circuit of FIG. 6 will be described below.

The sixth source driver 206f may include the first, second, and third amplifiers 311, 312, and 313, the first, second, and third switches 301, 302, and 303, and the sixth switch 306 disposed between an output terminal of the third amplifier 313 and an output terminal of the first amplifier 311. For example, a control signal of each of the switches 301 to 306 may be provided from the timing controller that receives a control signal of the processor 140.

With regard to drive the sixth source driver 206f of the above-described configuration, the second logic circuit 202b may deactivate the first amplifier 311 and may open the first switch 301. The second logic circuit 202b may activate the second amplifier 312 and the third amplifier 313 and may close the second switch 302, the third switch 303, and the sixth switch 306. As such, an output of the third amplifier 313 may be supplied to the first channel Source n, without the first amplifier 311 being active. According to the above-described driving manner, a display driver integrated circuit driving the second display panel 160b of the stripe layout type and an electronic device including the same may reduce power consumption by the deactivation of the first amplifier 311.

The sixth source driver 206f may include the first, second, and third decoders 321, 322, and 323. The sixth source driver 206f may include the first gamma output adjustment switch 341 disposed between an output terminal of the first gamma generation unit 211 and the first decoder 321, the second gamma output adjustment switch 342 disposed between an output terminal of the second gamma generation unit 212 and the second decoder 322, and the third gamma output adjustment switch 343 disposed between an output terminal of the third gamma generation unit 213 and the third decoder 323. Also, the sixth source driver 206*f* may include the gamma value sharing switch 331 disposed between the output terminal of the third gamma generation unit 213 and an input terminal of the first decoder 321 and the second gamma value sharing switch 332 disposed between the output terminal of the third gamma generation unit 213 and an input terminal of the second decoder 322.

The first, second, and third decoders 321, 322, and 323 may receive display data and a digital gamma value from the second logic circuit 202*b*. For example, the second decoder 322 may receive the second digital gamma value 502 from the second logic circuit 202*b*. Also, each of the second and third decoders 322 and 323 may receive a third gamma value that the third gamma generation unit 213 generates. In this regard, the third gamma output adjustment switch 343 and the second gamma value sharing switch 332 may be closed under control of the first logic circuit 202*a*. The second digital gamma value 502 from the second logic circuit 202*b* and a third gamma value may be supplied to the second decoder 322.

The display driver integrated circuit 200 of the above-described configuration and the electronic device 100 including the same may activate a gamma generation unit (e.g., the third gamma generation unit 213) of the gamma circuit 208, which is associated with a gamma value of one color, and may not generate gamma values associated with the remaining colors. Accordingly, it may be possible to relatively reduce power needed to operate the gamma circuit 208 compared with a situation in which gamma values of all colors are generated.

According to one or more embodiments, an electronic device may be provided. The electronic device may include a display panel and a driver circuit configured to drive the display panel, wherein the driver circuit includes a gamma circuit including a plurality of gamma generation units, a source driver including a plurality of amplifiers, each amplifier having a corresponding decoder, one or more switches configured to connect at least one of the plurality of gamma generation units to at least two decoders, and a logic circuit configured to control the source driver and the gamma circuit. The logic circuit is configured to control one of the plurality of gamma generation units to generate a gamma value for one or more sub pixels; and control the one or more switches so that the generated gamma value is shared with the at least two decoders when the display panel is set to output a luminance equal to or lower than a specified value.

According to an embodiment, the gamma value may correspond to a first color, and the logic circuit may be further configured to control the one or more switches so that the generated gamma value is shared with a first decoder corresponding to a sub pixel of the first color and a second decoder corresponding to a sub pixel of a second color.

According to an embodiment, the gamma value may correspond to a red sub pixel, and the logic circuit may be further configured to control the one or more switches so that the generated gamma value is shared with a first decoder corresponding to the red sub pixel and a second decoder corresponding to a blue sub pixel.

According to an embodiment, the gamma value may correspond to a blue sub pixel, and the logic circuit may be further configured to control the one or more switches so that the generated gamma value is shared with a first decoder corresponding to the blue sub pixel and a second decoder corresponding to a red sub pixel.

According to an embodiment, the gamma value may correspond to a blue sub pixel, and the logic circuit may be further configured to control the one or more switches so that the generated gamma value is shared with a first decoder corresponding to the blue sub pixel and second decoders corresponding to sub pixels of two other colors.

According to an embodiment, the logic circuit may be configured to generate a digital gamma value corresponding to a red sub-pixel based on a blue gamma curve and supply the digital gamma value to a decoder or an amplifier corresponding to the red sub pixel.

According to an embodiment, the logic circuit may be configured to generate a digital gamma value corresponding to a green sub pixel based on a blue gamma curve and supply the digital gamma value to a decoder or an amplifier corresponding to the green sub pixel.

According to an embodiment, the source driver may include a first amplifier corresponding to a sub pixel of a first color, a second amplifier corresponding to a sub pixel of a second color, and a third amplifier and a fourth amplifier corresponding to sub pixels of a third color. The source drive may also include a second switch configured to connect an output terminal of the third amplifier with an output terminal of the fourth amplifier. The logic circuit may be further configured to deactivate the third amplifier and control the second switch so that an output of the fourth amplifier is supplied to the sub pixels of the third color.

According to an embodiment, the source driver may include a first amplifier corresponding to a sub pixel of a first color, a second amplifier corresponding to a sub pixel of a second color, and a third amplifier and a fourth amplifier corresponding to sub pixels of a third color. The source drive may also include a second switch configured to connect an output terminal of the third amplifier with an output terminal of the fourth amplifier and a third switch configured to connect an output terminal of the first amplifier and an output terminal of the second amplifier. The logic circuit may be further configured to deactivate the first amplifier and the third amplifier, control the third switch so that an output of the second amplifier is supplied to the sub pixel of the first color and the sub pixel of the second color, and control the second switch so that an output of the fourth amplifier is supplied to the sub pixels of the third color.

According to an embodiment, the source driver may include a first amplifier corresponding to a sub pixel of a first color, a second amplifier corresponding to a sub pixel of a second color, and a third amplifier corresponding to a sub pixel of a third color. The source drive may also include a second switch configured to connect an output terminal of the first amplifier and an output terminal of the second amplifier. The logic circuit may be further configured to deactivate the first amplifier and control the second switch so that an output of the second amplifier is supplied to the sub pixel of the first color and the sub pixel of the second color.

Figure 9:
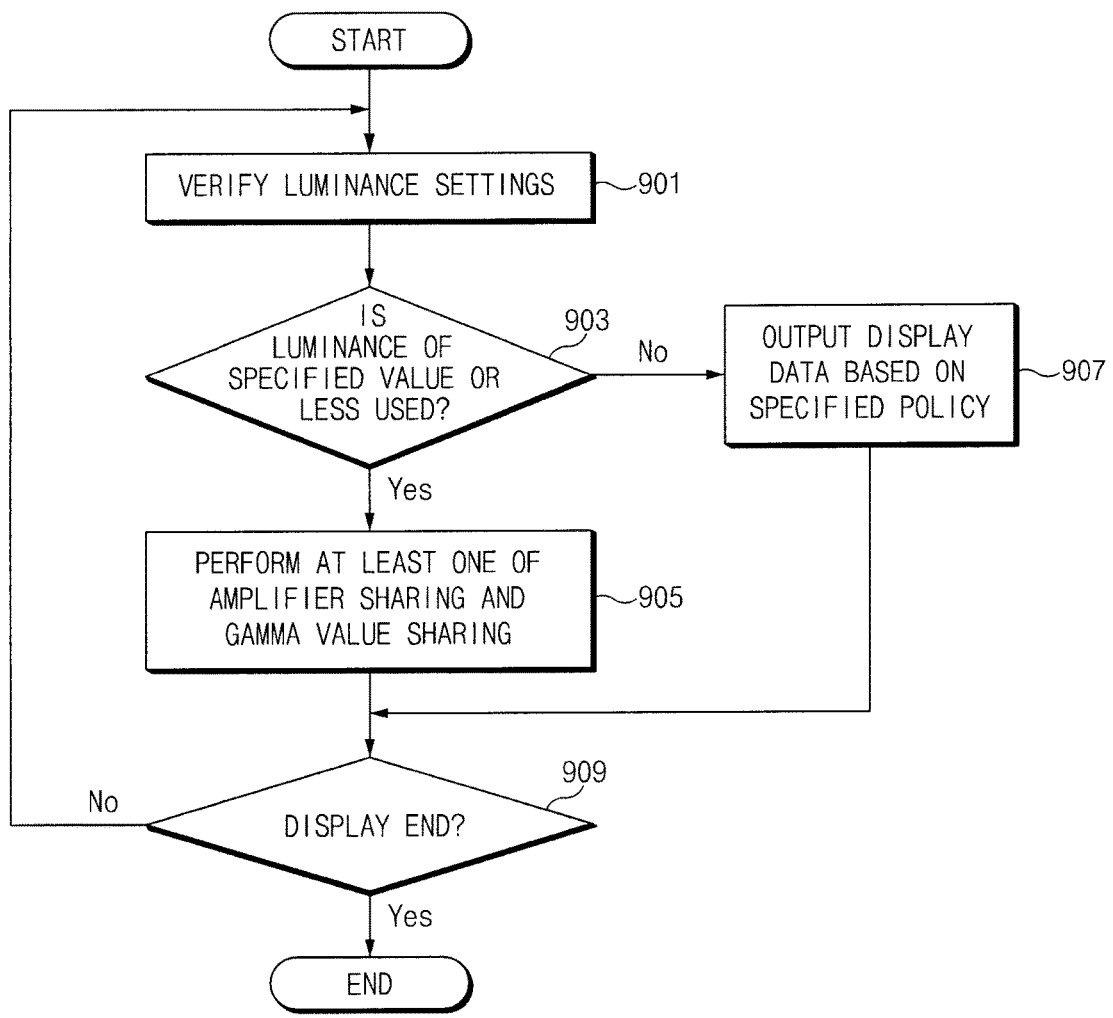
FIG. 9 is a flowchart illustrating a display driving method, according to an embodiment of the present disclosure.

FIG. 9 is a flowchart illustrating a display driving method, according to an embodiment of the present disclosure.

Referring to FIG. 9, in a display driving method according to an embodiment of the present disclosure, in operation 901, the processor 140 of the electronic device 100 may verify luminance settings of the display panel by determining the luminance setting. For example, in the case where the processor 140 is set or requested to output a specified screen through the display panel 160, the processor 140 may determine the luminance settings of display data to be output to the display panel 160. With regard to determining the luminance settings, the processor 140 may verify a user input associated with luminance adjustment, a kind of an application displayed, the display entering a mode (e.g., an AOD mode, a low-power mode, or the like), a battery level of the electronic device, and the like. Alternatively, the processor 140 may determine whether a state is set to output display data by using only some colors (e.g., a white color or a black color). The processor 140 may determine a state, which is set to output an object by using only some colors, as a low-luminance setting. With regard to determining the luminance based on the kind of applications, the processor 140 may store and manage a table that includes a setting luminance value for each application. Alternatively, when an application is executed, the processor 140 may verify a luminance value based on a screen policy of the application.

As the luminance settings are verified, in operation 903, the processor 140 may determine whether the luminance setting is at or below a specified value. For example, the processor 140 may determine whether luminance of a screen that is requested to be displayed in the display panel 160 corresponds to setting of specified luminance or less.

In the case where luminance setting is at or below the specified value, in operation 905, the processor 140 may perform at least one of amplifier sharing and gamma value sharing. The amplifier sharing and gamma value sharing operation may include driving that is performed according to at least one of manners described with reference to FIGS. 3 to 8. In a low luminance setting, the processor 140 may transition to a sleep state. In this case, the display driver integrated circuit 200 may process the amplifier sharing and gamma value sharing operation based on an instruction that the processor 140 provides prior to entering to the sleep state or an instruction that is stored in advance.

In the case where luminance setting exceeds the specified value, in operation 907, the processor 140 may perform a display data output operation based on a specified policy. For example, the processor 140 may control the display driver integrated circuit 200 such that all amplifiers allocated to sub pixels are activated or a gamma value corresponding to each of the sub pixels is generated and supplied by using a gamma circuit.

In operation 909, the processor 140 may determine whether an event associated with a display end occurs. In the case where the event associated with the display end does not occur, the process may proceed to operation 901 to repeat the above-described operations. When the event associated with the display end occurs, the processor 140 may end the display data output operation.

Figure 10:
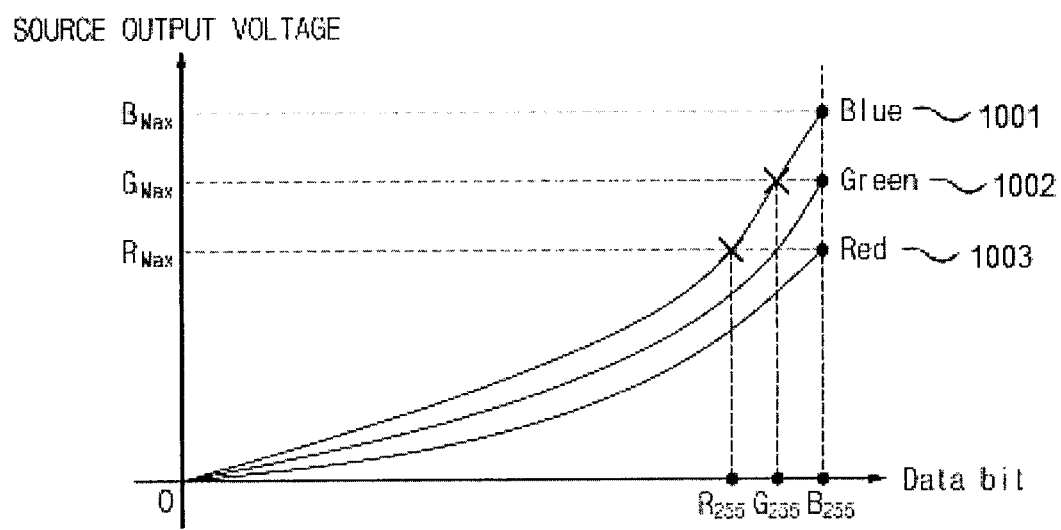
FIG. 10 is a graph of an output of a digital gamma value, according to an embodiment of the present disclosure.

FIG. 10 is a graph of an output of a digital gamma value, according to an embodiment of the present disclosure.

A gamma value curve for each color is depicted with a graph as illustrated in FIG. 10. The graphs may include gamma value curves respectively associated with colors. For example, a first graph 1001 may include a gamma value curve associated with a blue color. A second graph 1002 may include a gamma value curve associated with a green color. A third graph 1003 may include a gamma value curve associated with a red color. A right end of the first graph 1001 may be a 255 grayscale value of the blue color. Graph shapes may be changed according to physical characteristics of sub pixels in the display panel 160. For example, as illustrated in FIG. 10, the source output voltage of a blue color is illustrated as being the highest in this embodiment. In another embodiment, however, the graph for red color may be the highest depending on the material composition of sub pixels.

According to an embodiment of the present disclosure, the processor 140 of the electronic device 100 may control one gamma generation unit (e.g., a blue gamma generation unit) to generate an analog gamma value corresponding to a gamma value curve and may deactivate other gamma generation units (e.g., red and green). In this case, the processor 140 may calculate digital gamma values of red and green colors by using the gamma value curve of the blue color. For example, depending on the display data, the processor 140 may set a blue gamma value corresponding to a source output voltage $G_{Max}$ as the maximum grayscale level (e.g., $G_{255}$) of the green color. The processor 140 may further divide the gamma value curve of the blue color into 256 grayscale levels from 0 to $G_{255}$, up to $G_{Max}$, to calculate a digital gamma value of the green color. In this case, the processor 140 may minimize distortion of a gamma value by using the remaining grayscale values "0" to "254" other than a $G_{255}$ value. Similarly, the processor 140 may specify a blue gamma value corresponding to $R_{Max}$ as the maximum grayscale level (e.g., $R_{255}$) of the red color and may divide the gamma value curve of the blue color into 256 grayscale levels from 0 to $R_{255}$, up to $R_{Max}$, to calculate a digital gamma value of the red color. The processor 140 may divide a vertical axis into 255 sections 0 to $R_{Max}$ or 0 to $G_{Max}$ uniformly (or irregularly) and may map a grayscale value onto each section.

Through the above-described manner, the electronic device 100 according to an embodiment of the present disclosure may calculate digital gamma values of other colors by using a gamma value curve of a specified color and may apply the calculated digital gamma values to display data. Accordingly, the electronic device 100 according to an embodiment of the present disclosure may maintain a screen of appropriate luminance while reducing power needed to operate a gamma circuit.

According to one or more embodiments, a method for driving a display is provided. The method may include determining a luminance setting of an output of a display panel; generating a gamma value corresponding (e.g., by one gamma generation unit among a plurality of gamma generation units or by tow gamma generation units among a plurality of gamma generation units) to at least one sub pixel among sub pixels composing a pixel of the display panel when the luminance setting is equal to or lower than a specified value; and supplying the generated gamma value to the at least one sub pixel and at least one other sub pixel.

According to an embodiment, the gamma value may correspond to a first color, and supplying the generated gamma value may further include supplying the generated gamma value to all the sub pixels composing the pixel.

According to an embodiment, the gamma value may correspond to a red sub pixel, and supplying the generated gamma value may further include supplying the generated gamma value to a red sub pixel and a blue sub pixel.

According to an embodiment, the gamma value may correspond to a blue sub pixel, and supplying the generated gamma value may further include supplying the generated gamma value to a blue sub pixel and a red sub pixel.

According to an embodiment, the gamma value may correspond to a blue sub pixel, and supplying the generated gamma value may further include supplying the generated gamma value to a blue sub pixel, a red sub pixel, and a green sub pixel.

According to an embodiment, the method may further include generating a digital gamma value corresponding to the red sub pixel based on a blue gamma curve and supplying the digital gamma value to a decoder or an amplifier corresponding to the red sub pixel.

According to an embodiment, the method may further include generating a digital gamma value corresponding to the green sub pixel based on a blue gamma curve and supplying the digital gamma value to a decoder or an amplifier corresponding to the green sub pixel.

According to an embodiment, the display may include a source driver including a first amplifier corresponding to a sub pixel of a first color, a second amplifier corresponding to a sub pixel of a second color, and a third amplifier and a fourth amplifier corresponding to sub pixels of a third color, and the method may further include deactivating the third amplifier and supplying an output of the fourth amplifier to the sub pixels of the third color.

According to an embodiment, the display may include a source driver including a first amplifier corresponding to a sub pixel of a first color, a second amplifier corresponding to a sub pixel of a second color, and a third amplifier and a fourth amplifier corresponding to sub pixels of a third color, and the method may further include deactivating the first amplifier and the third amplifier, supplying an output of the second amplifier with the sub pixel of the first color and supplying an output of the fourth amplifier to the sub pixels of the third color.

According to an embodiment, the display may include a source driver including a first amplifier corresponding to a sub pixel of a first color, a second amplifier corresponding to a sub pixel of a second color, and a third amplifier corresponding to a sub pixel of a third color, and the method may further include deactivating the first amplifier and supplying an output of the second amplifier to the sub pixel of the first color.

Figure 11:
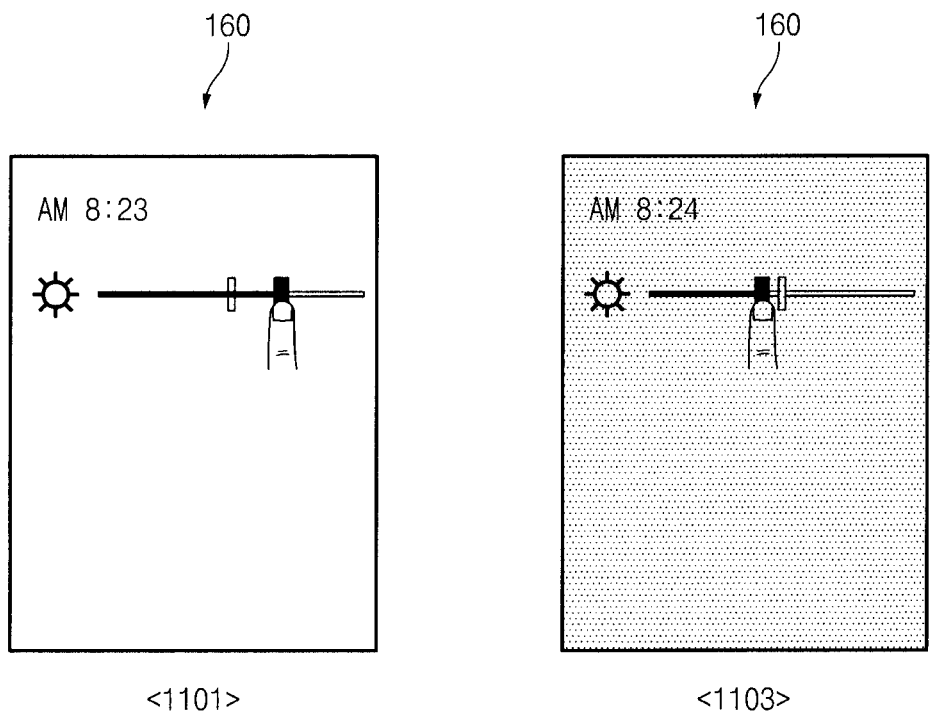
FIG. 11 is a view illustrating how a display is driven according to luminance adjustment, according to an embodiment of the present disclosure.

FIG. 11 is a view for describing how a display is driven according to luminance adjustment, according to an embodiment of the present disclosure.

Referring to FIG. 11, in state 1101, in the case where luminance currently set according to a user input is a first luminance value (e.g., in the case where the currently set luminance exceeds a specified luminance value), the processor 140 may activate all amplifiers of sub pixels composing a pixel and may supply specified display data to each amplifier. Also, the processor 140 may generate a gamma value (e.g., an analog gamma value) for each of colors of sub pixels and may supply the gamma value to each of channels (e.g., sub pixels).

In state 1103, in the case where luminance currently set according to a user input is a second luminance value (e.g., in the case wherein the currently set luminance is not more than the specified luminance value), as described above, the processor 140 may perform an amplifier sharing operation in which outputs of some of amplifiers of sub pixels composing a pixel are shared with any other amplifier(s) and the shared amplifiers are deactivated. Alternatively, the processor 140 may allow a gamma value (e.g., an analog gamma value) not to be generated for each of colors of sub pixels and a gamma value of a specified color to be shared with respect to any other color. Alternatively, the processor 140 may simultaneously perform an amplifier sharing operation and a gamma value sharing operation.

According to one or more embodiments, the processor 140 may operate various amplifier sharing and gamma value sharing, which are above described, with respect to a plurality of luminance levels. For example, the processor 140 may perform only the amplifier sharing in the case of outputting a screen of a specified first luminance range. The processor 140 may perform the amplifier sharing and the gamma value sharing in the case of outputting a screen of a specified second luminance range lower than the first luminance range. Alternatively, in the case of outputting a screen of the second luminance range lower than the first luminance range, the processor 140 may set the number of activated amplifiers so as to decrease compared with the case of outputting a screen of the first luminance range (or the number of deactivated amplifiers so as to increase compared with the case of outputting a screen of the first luminance range) and may set an output of an activated amplifier so as to be shared at other channels (e.g., sub pixels). Alternatively, in the case of outputting a screen of the second luminance range lower than the first luminance range, the processor 140 may set the number of activated gamma generation units so as to decrease compared with the case of outputting a screen of the first luminance range (or the number of deactivated gamma generation units so as to increase compared with the case of outputting a screen of the first luminance range) and may set a gamma value of an activated gamma generation unit so as to be shared. As described above, as luminance is lower, the processor 140 may set at least one of a decrease in the number of activated amplifiers and a decrease in activated gamma generation units.

To implement low-power driver circuit and electronic device, a source driver, a gamma circuit, and a logic circuit that are described through various embodiments may be configured such that at least one switch of the source driver is removed or the gamma circuit generates only a gamma value of a specified color. Also, the logic circuit may be configured such that instructions that are set to generate a digital gamma value are embedded therein. For example, in FIG. 3 or 5, in the case where an output of at least one amplifier of the source driver is designed to be shared, a turned-off amplifier (e.g., the fourth amplifier 314) may be removed during the design thereof, and it may be possible to provide an output for driving the pentile display panel 160 based on the first, second, and third amplifiers 311, 312, and 313. Alternatively, in FIG. 7, the source driver is designed such that the second amplifier 312 and the third amplifier 313 are included therein and may drive the pentile display panel 160 based on the designed configuration.

According to one or more embodiments, in FIGS. 3 and 4, in the case where a design is made to share a gamma value, the gamma circuit 208 may be designed to generate only gamma values of two colors (e.g., red and green). Alternatively, in FIGS. 5 to 8, in the case where a design is made to share a gamma value, the gamma circuit 208 may be designed to generate only a gamma value of one color (e.g., blue). As described above, an electronic device, in which a screen of a display panel is output in a low luminance environment (e.g., an environment in which luminance is not more than 100 nit or 60 nit), may include only amplifiers of some of sub pixels included in a pixel, or may include a gamma circuit implemented to output gamma values associated with some colors. In the electronic device designed according to the above-described manner, it may be possible to design a source driver with a relatively inexpensive production cost.

According to one or more embodiments above described, a display driver integrated circuit may include a plurality of amplifiers allocated to sub pixels included in a pixel, a source driver including decoders connected with the amplifiers and at least switch, a gamma circuit providing a gamma voltage to the source driver, and a logic circuit (or a processor, a microcontroller, a timing controller, a register controller, or the like) controlling the source driver and the gamma circuit. The logic circuit may be configured to share an output value of an amplifier, which is allocated to a specified sub pixel, from among the plurality of amplifiers with at least one other sub pixel when a screen of a specified luminance value or less is requested to be output.

According to one or more embodiments, the logic circuit may generate a gamma value of a sub pixel, which corresponds to a specified color, from among the sub pixels and may supply the generated gamma value to a decoder allocated to the sub pixel of the specified color and a decoder allocated to at least one other sub pixel. In this operation, the logic circuit may be configured not to supply a gamma value to a decoder connected with a deactivated amplifier.

According to one or more embodiments above described, an electronic device may include a display panel, a display driver integrated circuit, and a processor. When a user input associated with adjusting luminance to a specified value or lower is received or an application set to output a screen having luminance of a specified value or lower is executed, the processor may perform at least one of amplifier output sharing in which an output of at least one of amplifiers allocated to sub pixels included in the display driver integrated circuit is shared with another sub pixel and gamma value sharing in which a gamma value corresponding to a color of a specified sub pixel among the sub pixels is shared with other sub pixels.

According to one or more embodiments of the present disclosure, power consumption may be reduced by driving a display at low power in an environment in which luminance is not more than a specified value.

Also, it is possible to manufacture a display driver integrated circuit and an electronic device capable of driving a screen associated with a specified luminance environment at low power.

Figure 12:
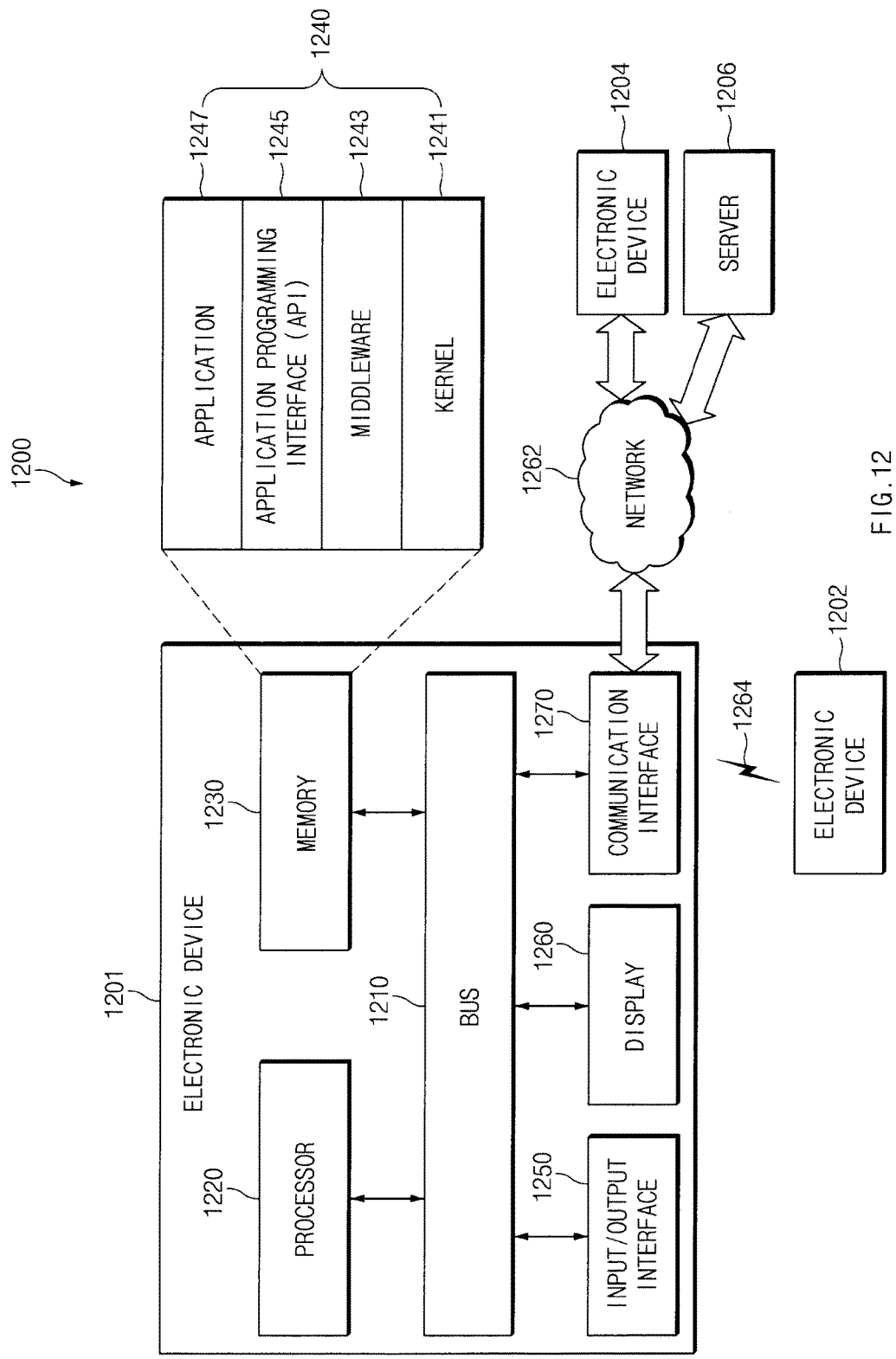
FIG. 12 is a block diagram illustrating a configuration of an electronic device in a network environment according to an embodiment.

FIG. 12 is a block diagram illustrating a configuration of an electronic device in a network environment according to an embodiment.

Referring to FIG. 12, in various embodiments, an electronic device 1201 and a first external electronic device 1202, a second external electronic device 1204, or a server 1206 may connect with each other through a network 1262 or local-area communication 1264. The electronic device 1201 may include a bus 1210, a processor 1220, a memory 1230, an input and output interface 1250, a display 1260, and a communication interface 1270. In various embodiments, at least one of the components may be omitted from the electronic device 1201, or other components may be additionally included in the electronic device 1201.

The bus 1210 may be, for example, a circuit which connects the components 1220 to 1270 with each other and transmits a communication signal (e.g., a control message and/or data) between the components.

The processor 1220 may include one or more of a central processing unit (CPU), an application processor (AP), or a communication processor (CP). For example, the processor 1220 may perform calculation or data processing about control and/or communication of at least another of the components of the electronic device 1201.

The memory 1230 may include a volatile and/or nonvolatile memory. The memory 1230 may store, for example, a command or data associated with at least another of the components of the electronic device 1201. According to an embodiment, the memory 1230 may store software and/or a program 1240. The program 1240 may include, for example, a kernel 1241, a middleware 1243, an application programming interface (API) 1245, and/or an least one application program 1247 (or "at least one application"), and the like. At least part of the kernel 1241, the middleware 1243, or the API 1245 may be referred to as an operating system (OS).

The kernel 1241 may control or manage, for example, system resources (e.g., the bus 1210, the processor 1220, or the memory 1230, and the like) used to execute an operation or function implemented in the other programs (e.g., the middleware 1243, the API 1245, or the application program 1247). Also, as the middleware 1243, the API 1245, or the application program 1247 accesses a separate component of the electronic device 1201, the kernel 1241 may provide an interface which may control or manage system resources.

The middleware 1243 may play a role as, for example, a go-between such that the API 1245 or the application program 1247 communicates with the kernel 1241 to communicate data.

Also, the middleware 1243 may process one or more work requests, received from the application program 1247, in order of priority. For example, the middleware 1243 may assign priority which may use system resources (the bus 1210, the processor 1220, or the memory 1230, and the like) of the electronic device 1201 to at least one of the at least one application program 1247. For example, the middleware 1243 may perform scheduling or load balancing for the one or more work requests by processing the one or more work requests in order of the priority assigned to the at least one of the at least one application program 1247.

The API 1245 may be, for example, an interface in which the application program 1247 controls a function provided from the kernel 1241 or the middleware 1243. For example, the API 1245 may include at least one interface or function (e.g., a command) for file control, window control, image processing, or text control, and the like.

The input and output interface 1250 may play a role as, for example, an interface which may transmit a command or data input from a user or another external device to another component (or other components) of the electronic device 1201. Also, input and output interface 1250 may output an instruction or data received from another component (or other components) of the electronic device 1201 to the user or the other external device.

The display 1260 may include, for example, a liquid crystal display (LCD), a light emitting diode (LED) display, an organic LED (OLED) display, a microelectromechanical systems (MEMS) display, or an electronic paper display. The display 1260 may display, for example, a variety of content (e.g., text, images, videos, icons, or symbols, and the like) to the user. The display 1260 may include a touch screen, and may receive, for example, touch, gesture, proximity, or a hovering input using an electronic pen or part of a body of the user.

The communication interface 1270 may establish communication between, for example, the electronic device 1201 and an external device (e.g., a first external electronic device 1202, a second external electronic device 1204, or a server 1206). For example, the communication interface 1270 may connect to a network 1262 through wireless communication or wired communication and may communicate with the external device (e.g., the second external electronic device 1204 or the server 1206).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1264. The local-area communication 1264 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1201 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1262 may include a telecommunications network, for example, at least one of a computer network (e.g., a local area network (LAN) or a wide area network (WAN)), the Internet, or a telephone network.

Each of the first and second external electronic devices 1202 and 1204 may be the same as or different device from the electronic device 1201. According to an embodiment, the server 1206 may include a group of one or more servers. According to various embodiments, all or some of operations executed in the electronic device 1201 may be executed in another electronic device or a plurality of electronic devices (e.g., the first external electronic device 1202, the second external electronic device 1204, or the server 1206). According to an embodiment, if the electronic device 1201 should perform any function or service automatically or according to a request, it may request another device (e.g., the first external electronic device 1202, the second external electronic device 1204, or the server 106) to perform at least part of the function or service, rather than executing the function or service for itself or in addition to the function or service. The other electronic device (e.g., the first external electronic device 1202, the second external electronic device 1204, or the server 1206) may execute the requested function or the added function and may transmit the executed result to the electronic device 1201. The electronic device 1201 may process the received result without change or additionally and may provide the requested function or service. For this purpose, for example, cloud computing technologies, distributed computing technologies, or client-server computing technologies may be used.

Figure 13:
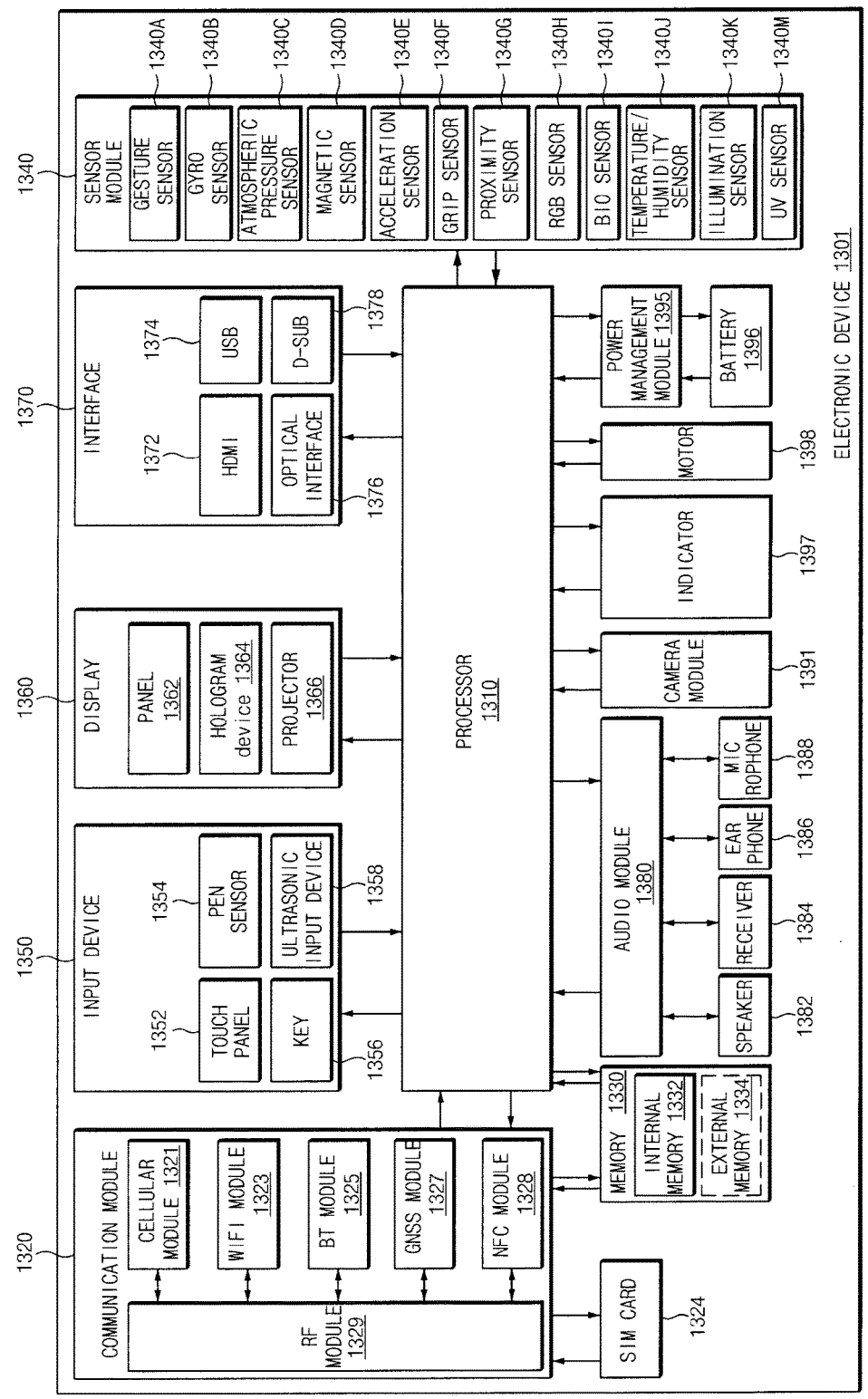
FIG. 13 is a block diagram illustrating a configuration of an electronic device according to an embodiment.

FIG. 13 is a block diagram illustrating a configuration of an electronic device according to one embodiment.

Referring to FIG. 13, the electronic device 1301 may include, for example, all or part of an electronic device 1201 shown in FIG. 12. The electronic device 1301 may include one or more processors 1310 (e.g., application processors (APs)), a communication module 1320, a subscriber identification module (SIM) 1329, a memory 1330, a security module 1336, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application program to control a plurality of hardware or software components connected thereto and may process and compute a variety of data. The processor 1310 may be implemented with, for example, a system on chip (SoC). According to an embodiment, the processor 1310 may include a graphic processing unit (GPU) (not shown) and/or an image signal processor (not shown). The processor 1310 may include at least some (e.g., a cellular module 1321) of the components shown in FIG. 13. The processor 1310 may load a command or data received from at least one of other components (e.g., a non-volatile memory) into a volatile memory to process the data and may store various data in a non-volatile memory.

The communication module 1320 may have the same or similar configuration to a communication interface 1370 of FIG. 12. The communication module 1320 may include, for example, the cellular module 1321, a wireless-fidelity (Wi-Fi) module 1322, a Bluetooth (BT) module 1323, a global navigation satellite system (GNSS) module 1324 (e.g., a GPS module, a Glonass module, a Beidou module, or a Galileo module), a near field communication (NFC) module 1325, an MST module 1326, and a radio frequency (RF) module 1327.

The cellular module 1321 may provide, for example, a voice call service, a video call service, a text message service, or an Internet service, and the like through a communication network. According to an embodiment, the cellular module 1321 may identify and authenticate the electronic device 1301 in a communication network using the SIM 1329 (e.g., a SIM card). According to an embodiment, the cellular module 1321 may perform at least part of functions which may be provided by the processor 1310. According to an embodiment, the cellular module 1321 may include a communication processor (CP).

The Wi-Fi module 1322, the BT module 1323, the GNSS module 1324, the NFC module 1325, or the MST module 1326 may include, for example, a processor for processing data transmitted and received through the corresponding module. According to various embodiments, at least some (e.g., two or more) of the cellular module 1321, the Wi-Fi module 1322, the BT module 1323, the GNSS module 1324, the NFC module 1325, or the MST module 1326 may be included in one integrated chip (IC) or one IC package.

The RF module 1327 may transmit and receive, for example, a communication signal (e.g., an RF signal). Though not shown, the RF module 1327 may include, for example, a transceiver, a power amplifier module (PAM), a frequency filter, or a low noise amplifier (LNA), or an antenna, and the like. According to another embodiment, at least one of the cellular module 1321, the Wi-Fi module 1322, the BT module 1323, the GNSS module 1324, the NFC module 1325, or the MST module 1326 may transmit and receive an RF signal through a separate RF module.

The SIM 1329 may include, for example, a card which includes a SIM and/or an embedded SIM. The SIM 1329 may include unique identification information (e.g., an integrated circuit card identifier (ICCID)) or subscriber information (e.g., an international mobile subscriber identity (IMSI)).

The memory 1330 (e.g., a memory 1230 of FIG. 12) may include, for example, an embedded memory 1332 or an external memory 1334. The embedded memory 1332 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1334 may include a flash drive, for example, a compact flash (CF), a secure digital (SD), a micro-SD, a mini-SD, an extreme digital (xD), a multimedia car (MMC), or a memory stick, and the like. The external memory 1334 may operatively and/or physically connect with the electronic device 1301 through various interfaces.

The secure module 1336 may be a module which has a relatively higher secure level than the memory 1330 and may be a circuit which stores secure data and guarantees a protected execution environment. The secure module 1336 may be implemented with a separate circuit and may include a separate processor. The secure module 1336 may include, for example, an embedded secure element (eSE) which is present in a removable smart chip or a removable SD card or is embedded in a fixed chip of the electronic device 1301. Also, the secure module 1336 may be driven by an OS different from the OS of the electronic device 1301. For example, the secure module 1336 may operate based on a java card open platform (JCOP) OS.

The sensor module 1340 may measure, for example, a physical quantity or may detect an operation state of the electronic device 1301, and may convert the measured or detected information to an electric signal. The sensor module 1340 may include at least one of, for example, a gesture sensor 1340A, a gyro sensor 1340B, a barometer sensor 1340C, a magnetic sensor 1340D, an acceleration sensor 1340E, a grip sensor 1340F, a proximity sensor 1340G, a color sensor 1340H (e.g., red, green, blue (RGB) sensor), a biometric sensor 1340I, a temperature/humidity sensor 1340J, an illumination sensor 1340K, or an ultraviolet (UV) sensor 1340M. Additionally or alternatively, the sensor module 1340 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1340 may further include a control circuit for controlling at least one or more sensors included therein. According to various embodiments, the electronic device 1301 may further include a processor configured to control the sensor module 1340, as part of the processor 1310 or to be independent of the processor 1310. While the processor 1310 is in a sleep state, the electronic device 1301 may control the sensor module 1340.

The input device 1350 may include, for example, a touch panel 1352, a (digital) pen sensor 1354, a key 1356, or an ultrasonic input device 1358. The touch panel 1352 may use at least one of, for example, a capacitive type, a resistive type, an infrared type, or an ultrasonic type. Also, the touch panel 1352 may further include a control circuit. The touch panel 1352 may further include a tactile layer and may provide a tactile reaction to a user.

The (digital) pen sensor 1354 may be, for example, part of the touch panel 1352 or may include a separate sheet for recognition. The key 1356 may include, for example, a physical button, an optical key, or a keypad. The ultrasonic input device 1358 may allow the electronic device 1301 to detect a sound wave using a microphone (e.g., a microphone 1388) and to verify data through an input tool generating an ultrasonic signal.

The display 1360 (e.g., a display 1260 of FIG. 12) may include a panel 1362, a hologram device 1364, or a projector 1366. The panel 1362 may include the same or similar configuration to the display 160 or 1260. The panel 1362 may be implemented to be, for example, flexible, transparent, or wearable. The panel 1362 and the touch panel 1352 may be integrated into one module. The hologram device 1364 may show a stereoscopic image in a space using interference of light. The projector 1366 may project light onto a screen to display an image. The screen may be positioned, for example, inside or outside the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature 1378. The interface 1370 may be included in, for example, a communication interface 170 or 1270 shown in FIG. 2 or 12. Additionally or alternatively, the interface 1370 may include, for example, a mobile high definition link (MHL) interface, an SD card/multimedia card (MMC) interface, or an infrared data association (IrDA) standard interface.

The audio module 1380 may convert a sound and an electric signal in dual directions. At least part of components of the audio module 1380 may be included in, for example, an input and output interface 1250 (or a user interface) shown in FIG. 12. The audio module 1380 may process sound information input or output through, for example, a speaker 1382, a receiver 1384, an earphone 1386, or the microphone 1388, and the like.

The camera module 1391 may be a device which captures a still image and a moving image. According to an embodiment, the camera module 1391 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1395 may manage, for example, power of the electronic device 1301. According to an embodiment, though not shown, the power management module 1395 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1396 and voltage, current, or temperature thereof while the battery 1396 is charged. The battery 1396 may include, for example, a rechargeable battery or a solar battery.

The indicator 1397 may display a specific state of the electronic device 1301 or part (e.g., the processor 1310) thereof, for example, a booting state, a message state, or a charging state, and the like. The motor 1398 may convert an electric signal into mechanical vibration and may generate vibration or a haptic effect, and the like. Though not shown, the electronic device 1301 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a display panel; and
a driver circuit configured to drive the display panel,
wherein the driver circuit includes:
a gamma circuit including a plurality of gamma generation units;
a source driver including a plurality of amplifiers, each amplifier corresponding to a decoder;

one or more switches, one switch of the one or more switches configured to connect one of the plurality of gamma generation units to at least two decoders; and
a logic circuit configured to control the source driver and the gamma circuit,
wherein the logic circuit is configured to:
control the one of the plurality of gamma generation units to generate a gamma value for one or more sub pixels, wherein the gamma value corresponds to a first color; and
control the one switch so that the generated gamma value is shared with a first decoder and a second decoder of the at least two decoders, when the display panel is set to output a luminance equal to or lower than a specified value, wherein the first decoder corresponds to a sub pixel of the first color and the second decoder corresponds to a sub pixel of a second color,
wherein the first color and the second color are different each other and each one comprises one of red, blue and green.

2. The electronic device of claim 1, wherein the gamma value corresponds to a red sub pixel, and the logic circuit is further configured to control the one or more switches so that the generated gamma value is shared with a first decoder corresponding to the red sub pixel and a second decoder corresponding to a blue sub pixel.

3. The electronic device of claim 1, wherein the gamma value corresponds to a blue sub pixel, and the logic circuit is further configured to control the one or more switches so that the generated gamma value is shared with a first decoder corresponding to the blue sub pixel and a second decoder corresponding to a red sub pixel.

4. The electronic device of claim 1, wherein the gamma value corresponds to a blue sub pixel, and the logic circuit is further configured to control the one or more switches so that the generated gamma value is shared with a first decoder corresponding to the blue sub pixel and second decoders corresponding to sub pixels of two other colors.

5. The electronic device of claim 4, wherein the logic circuit is further configured to:
generate a digital gamma value corresponding to a red sub-pixel based on a blue gamma curve; and
supply the digital gamma value to a decoder or an amplifier corresponding to the red sub pixel.

6. The electronic device of claim 4, wherein the logic circuit is further configured to:
generate a digital gamma value corresponding to a green sub pixel based on a blue gamma curve; and
supply the digital gamma value to a decoder or an amplifier corresponding to the green sub pixel.

7. The electronic device of claim 1, wherein the plurality of amplifiers includes a first amplifier corresponding to a sub pixel of a first color, a second amplifier corresponding to a sub pixel of a second color, and a third amplifier and a fourth amplifier corresponding to sub pixels of a third color,
wherein the source driver further includes a second switch configured to connect an output terminal of the third amplifier with an output terminal of the fourth amplifier, and
wherein the logic circuit is further configured to:
deactivate the third amplifier and control the second switch so that an output of the fourth amplifier is supplied to the sub pixels of the third color.

8. The electronic device of claim 1, wherein the plurality of amplifiers includes a first amplifier corresponding to a sub pixel of a first color, a second amplifier corresponding to a sub pixel of a second color, and a third amplifier and a fourth amplifier corresponding to sub pixels of a third color,
wherein the source driver further includes a second switch configured to connect an output terminal of the third amplifier with an output terminal of the fourth amplifier and a third switch configured to connect an output terminal of the first amplifier and an output terminal of the second amplifier, and
wherein the logic circuit is further configured to:
deactivate the first amplifier and the third amplifier, control the third switch so that an output of the second amplifier is supplied to the sub pixel of the first color and the sub pixel of the second color, and control the second switch so that an output of the fourth amplifier is supplied to the sub pixels of the third color.

9. The electronic device of claim 1, wherein the plurality of amplifiers includes a first amplifier corresponding to a sub pixel of a first color, a second amplifier corresponding to a sub pixel of a second color, and a third amplifier corresponding to a sub pixel of a third color,
wherein the source driver further includes a second switch configured to connect an output terminal of the first amplifier and an output terminal of the second amplifier, and
wherein the logic circuit is further configured to:
deactivate the first amplifier and control the second switch so that an output of the second amplifier is supplied to the sub pixel of the first color and the sub pixel of the second color.

10. A method for driving a display, the method comprising:
determining a luminance setting of an output of a display panel;
generating, by one gamma generation unit among a plurality of gamma generation units, a gamma value corresponding to at least one sub pixel among sub pixels composing a pixel of the display panel when the luminance setting is equal to or lower than a specified value; and
supplying the generated gamma value to the at least one sub pixel and at least one other sub pixel,
wherein the gamma value corresponds to a first color, and supplying the generated gamma value further comprises supplying the generated gamma value to another sub pixel composing the pixel.

11. The method of claim 10, wherein the gamma value corresponds to a first color, and supplying the generated gamma value further comprises supplying the generated gamma value to all the sub pixels composing the pixel.

12. The method of claim 10, wherein the gamma value corresponds to a red sub pixel, and supplying the generated gamma value further comprises supplying the generated gamma value to a red sub pixel and a blue sub pixel.

13. The method of claim 10, wherein the gamma value corresponds to a blue sub pixel, and supplying the generated gamma value further comprises supplying the generated gamma value to a blue sub pixel and a red sub pixel.

14. The method of claim 10, wherein the gamma value corresponds to a blue sub pixel, and supplying the generated gamma value further comprises supplying the generated gamma value to a blue sub pixel, a red sub pixel, and a green sub pixel.

15. The method of claim 14, further comprising:
generating a digital gamma value corresponding to the red sub pixel based on a blue gamma curve; and
supplying the digital gamma value to a decoder or an amplifier corresponding to the red sub pixel.

16. The method of claim 14, further comprising:
generating a digital gamma value corresponding to the green sub pixel based on a blue gamma curve; and
supplying the digital gamma value to a decoder or an amplifier corresponding to the green sub pixel.

17. The method of claim 10, wherein the display comprises a source driver including a first amplifier corresponding to a sub pixel of a first color, a second amplifier corresponding to a sub pixel of a second color, and a third amplifier and a fourth amplifier corresponding to sub pixels of a third color, and the method further comprises:
deactivating the third amplifier; and
supplying an output of the fourth amplifier to the sub pixels of the third color.

18. The method of claim 10, wherein the display comprises a source driver including a first amplifier corresponding to a sub pixel of a first color, a second amplifier corresponding to a sub pixel of a second color, and a third amplifier and a fourth amplifier corresponding to sub pixels of a third color, and the method further comprises:
deactivating the first amplifier and the third amplifier;
supplying an output of the second amplifier with the sub pixel of the first color; and
supplying an output of the fourth amplifier to the sub pixels of the third color.

19. The method of claim 10, wherein the display comprises a source driver including a first amplifier corresponding to a sub pixel of a first color, a second amplifier corresponding to a sub pixel of a second color, and a third amplifier corresponding to a sub pixel of a third color, and the method further comprises:
deactivating the first amplifier; and
supplying an output of the second amplifier to the sub pixel of the first color.

20. An electronic device comprising:
a display panel; and
a driver circuit configured to drive the display panel,
wherein the driver circuit includes:
a gamma circuit including a plurality of gamma generation units corresponding with sub-pixel colors of a pixel;
a source driver including a plurality of amplifiers corresponding with sub-pixel colors of the pixel;
a plurality of decoders corresponding with sub-pixel colors of the pixels; and
one or more switches configured to connect one of the plurality of amplifiers corresponding with one of the sub-pixel colors to one of the decoder corresponding with another one of the sub-pixel colors when the display panel is set to output a luminance equal to or lower than a specified value.

* * * * *